United States Patent
Owens et al.

(10) Patent No.: US 12,533,850 B2
(45) Date of Patent: Jan. 27, 2026

(54) TRUSSED STRUCTURES FOR ADDITIVE MANUFACTURING AND METHODS OF FORMATION THEREOF

(71) Applicant: Orca Sciences LLC, Kirkland, WA (US)

(72) Inventors: Dylan Owens, Kirkland, WA (US); Menyoung Lee, Kirkland, WA (US); Patrick Gallagher, Kirkland, WA (US)

(73) Assignee: Orca Sciences LLC, Kirkland, WA (US)

(*) Notice: Subject to any disclaimer, the term of this patent is extended or adjusted under 35 U.S.C. 154(b) by 0 days.

(21) Appl. No.: 19/265,915

(22) Filed: Jul. 10, 2025

(65) Prior Publication Data

US 2026/0014756 A1    Jan. 15, 2026

Related U.S. Application Data

(60) Provisional application No. 63/669,406, filed on Jul. 10, 2024.

(51) Int. Cl.
*B29C 64/282* (2017.01)
*B23K 26/06* (2014.01)
(Continued)

(52) U.S. Cl.
CPC ........ *B29C 64/282* (2017.08); *B23K 26/0604* (2013.01); *B23K 26/0643* (2013.01); *B23K 26/083* (2013.01); *B23K 26/125* (2013.01); *B23K 26/342* (2015.10); *B29C 64/268* (2017.08); *B29C 64/371* (2017.08); *B33Y 10/00* (2014.12); *B33Y 40/20* (2020.01)

(58) Field of Classification Search
CPC ... B29C 64/282; B29C 64/268; B29C 64/371; B33Y 10/00; B33Y 40/20; B23K 26/0643; B23K 26/125; B23K 26/083; B23K 26/342; B23K 26/0604
See application file for complete search history.

(56) References Cited

U.S. PATENT DOCUMENTS

| | | | |
|---|---|---|---|
| 4,832,881 A | 5/1989 | Arnold et al. | |
| 5,126,200 A | 6/1992 | Nordine | |

(Continued)

FOREIGN PATENT DOCUMENTS

| | | | |
|---|---|---|---|
| CN | 1631848 A | 6/2005 | |
| CN | 101209833 A | 7/2008 | |

(Continued)

OTHER PUBLICATIONS

"3D Printing Carbon Fiber and Other Composites, What Composites Do for 3D Printing", Markforged, https://markforged.com/resources/learn/design-for-additive-manufacturing-plastics-composites/understanding-3d-printing-strength/3d-printing-carbon-fiber-and-other-composites, first downloaded May 2, 2024.

(Continued)

*Primary Examiner* — Mathieu D Vargot
(74) *Attorney, Agent, or Firm* — Jeffrey Schox; Randy Mehlenbacher

(57) ABSTRACT

A method for forming a skeleton (e.g., space frame, trussed structure, regular foam, open-cell foam, closed cell foam, etc.) can include providing instructions for spatial locations of optical hot spots, generating the optical hot spots, and growing material at the optical hot spots to form the skeleton. The method can optionally include shaping the grown material and/or infilling the skeleton.

20 Claims, 14 Drawing Sheets

(51) Int. Cl.
*B23K 26/08* (2014.01)
*B23K 26/12* (2014.01)
*B23K 26/342* (2014.01)
*B29C 64/268* (2017.01)
*B29C 64/371* (2017.01)
*B33Y 10/00* (2015.01)
*B33Y 40/20* (2020.01)

(56) References Cited

U.S. PATENT DOCUMENTS

| | | | |
|---|---|---|---|
| 5,282,861 | A | 2/1994 | Kaplan |
| 5,707,409 | A | 1/1998 | Martin et al. |
| 9,926,199 | B1 | 3/2018 | Jacobsen |
| 11,602,792 | B2 | 3/2023 | Feldmann et al. |
| 2004/0089237 | A1 | 5/2004 | Pruett et al. |
| 2005/0224220 | A1 | 10/2005 | Li et al. |
| 2009/0098291 | A1 | 4/2009 | Hwang et al. |
| 2011/0139209 | A1 | 6/2011 | Lang et al. |
| 2014/0010951 | A1 | 1/2014 | Vargas et al. |
| 2014/0147747 | A1 | 5/2014 | King et al. |
| 2015/0056464 | A1 | 2/2015 | Brice |
| 2015/0290771 | A1 | 10/2015 | Li |
| 2016/0263822 | A1 | 9/2016 | Boyd, IV |
| 2017/0256385 | A1 | 9/2017 | Paskalova |
| 2018/0070736 | A1 | 3/2018 | Achten et al. |
| 2018/0154438 | A1 | 6/2018 | Mark |
| 2018/0154445 | A1 | 6/2018 | Barr et al. |
| 2018/0186081 | A1 | 7/2018 | Milshtein et al. |
| 2018/0250775 | A1 | 9/2018 | Spink et al. |
| 2019/0061003 | A1 | 2/2019 | Itotsubo |
| 2020/0023584 | A1 | 1/2020 | Portela et al. |
| 2020/0062600 | A1 | 2/2020 | Kidambi et al. |
| 2021/0187897 | A1 | 6/2021 | Reinhall et al. |
| 2021/0289676 | A1 | 9/2021 | Shin et al. |
| 2022/0079280 | A1 | 3/2022 | Laperriere et al. |
| 2022/0310278 | A1 | 9/2022 | Choi et al. |
| 2022/0356583 | A1 | 11/2022 | Brown et al. |
| 2024/0076779 | A1 | 3/2024 | Gold |
| 2024/0392431 | A1 | 11/2024 | Gallagher et al. |

FOREIGN PATENT DOCUMENTS

| | | |
|---|---|---|
| CN | 109261958 A | 1/2019 |
| WO | 2019040468 A1 | 2/2019 |
| WO | 2022109263 A1 | 5/2022 |
| WO | 2024076541 A1 | 4/2024 |

OTHER PUBLICATIONS

"Carbon (RVC) Foam", ERG Aerospace, https://ergaerospace.com/carbon-rvc-foam-open-cell-material/, first downloaded Jun. 27, 2025.
"Ceramic and Metal Foams", Ultramet Advanced Material Solutions, ISO 9001:2015 Certified—DDTC (ITAR) 2024 Registered, https://ultramet.com/refractory-open-cell-foams/ceramic-and-metal-foams/, first downloaded Jun. 27, 2025.
"Reticulated Vitreous Carbon Foam", Ultramet, ISO 9001:2015 Certified—DDTC (ITAR) 2024 Registered, https://ultramet.com/refractory-open-cell-foams/reticulated-vitreous-carbon-foam/, first downloaded Jul. 9, 2025.
"The Complete Guide to 3D Printing Composites", 3D Natives, 3D Printing News, Jun. 28, 2023, https://www.3dnatives.com/en/complete-guide-3d-printing-composites-280120204/.
"Types of Lattices for Additive Manufacturing—Terms Engineers Need to Know", Altair, https://altair.com/blog/articles/types-of-lattices-for-additive-manufacturing-terms-engineers-need-to-know, Dec. 6, 2022.
Al-Furaiji, et al., "Enhancing iCVD Modification of Electrospun Membranes for Membrane Distillation Using a 3D Printed Scaffold", Polymers 2020, 12, 2074; doi: 10.3390/polym12092074.
Brooks, et al., "Rapid Design and Manufacture of Ultralight Cellular Materials", Solid Freeform Fabrication Symposium, Austin, Texas USA, Jan. 2005.
Galante, et al., "Additive manufacturing of ceramics for dental applications: A review", Dental Materials, 35, (2019) 825-846.
Gallagher, et al., "Laser Object Printing from a Gaseous Substrate", U.S. Appl. No. 19/114,199, filed Mar. 21, 2025.
Lee, Sarah, "Ceramic Foams: The Ultimate Guide", Number Analytics, numberanalytics.com/blog/ceramic-foams-ultimate-guide, Jun. 14, 2025.
Li, et al., "Tantalum coating on porous Ti6Al4V scaffold using chemical vapor deposition and preliminary biological evaluation", Materials Science and Engineering C 33 (2013) 2987-2994.
McGregor, et al., "Architectural bone parameters and the relationship to titanium lattice design for powder bed fusion additive manufacturing", Additive manufacturing 47(2021)23373. (Year: 2021).
Narasimman, et al., "Preparation of low density carbon foams by foaming molten sucrose using an aluminium nitrate blowing agent", Carbon, 50, 2012, pp. 1999-2009.
Nie, Wei, "Rapid mineralization of graphene-based 3D porous scaffolds by semi-dry electrodeposition for photothermal treatment of tumor-induced bone defects", Acta Biomaterialia 153 (2022) 573-584.
Odusanya, et al., "Laser-Assisted Growth of Carbon-Based Materials by Chemical Vapor Deposition", Journal of Carbon Research, 8, 24(2022) 1-11. (Year: 2022).
Schoen, Andyh. , "Infinite Periodic Minimal Surfaces Without Self-Intersections", NASA Technical Note, N A S A TN 015541, May 1970.
Wallenberger, et al., "Strong, Pure, and Uniform Carbon Fibers Obtained Directly from the Vapor Phase", Science, vol. 260, Apr. 2, 1993.
Williams, Kirkl. , "Laser-assisted CVD Fabrication and Characterization of Carbon and Tungsten Microhelices for Microthrusters", Dissertation, Uppsala University, Uppsala, Sweden, 2006.
Yildiz, et al., "Microporous vertically aligned CNT nanocomposites with tunable properties for use in flexible heat sinks", Journal of Science: Advanced Materials and Devices;Sep. 7, 2022 , 100509, p. 1-8. (Year: 2022).
Zhong, et al., "The Gibson-Ashby model for additively manufactured metal lattice materials: Its theoretical basis, limitations and new insights from remedies", Current Opinion in Solid State and Materials Science 27 (2023) 101081.

Spots cast into the focal plane
using a 3x3 DOE beamsplitter
in front of the lens Spots cast into the focal plane
using a 1x2 DOE beamsplitter
in front of the lens Spots cast into the focal plane
by cascading the 3x3 and 1x2
beamsplitters Spots cast into the focal plane
by cascading the 3x3 and 1x2
beamsplitters, with 1x2
beamsplitter rotated 45 deg

TRUSSED STRUCTURES FOR ADDITIVE MANUFACTURING AND METHODS OF FORMATION THEREOF

CROSS-REFERENCE TO RELATED APPLICATIONS

This application claims the benefit of U.S. Provisional Application No. 63/669,406 filed 10 Jul. 2024, which is incorporated in its entirety by this reference.

TECHNICAL FIELD

This invention relates generally to the optical-based material manufacturing field, and more specifically to a new and useful system and method in the optical-based material manufacturing field.

DETAILED DESCRIPTION

The following description of the embodiments of the invention is not intended to limit the invention to these embodiments, but rather to enable any person skilled in the art to make and use this invention.

1. Overview

Figure 1:
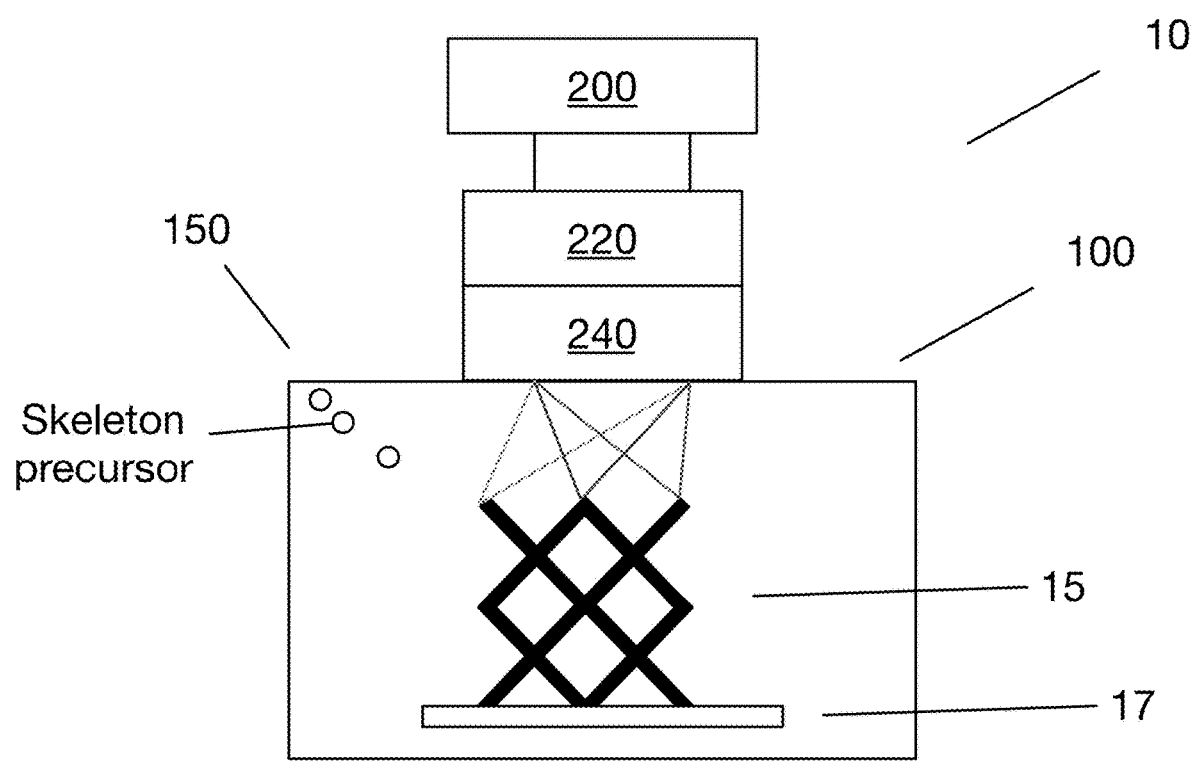
FIG. 1 is a schematic representation of an exemplary system for growth of a material skeleton.

As shown in FIG. 1, a system 10 for forming a skeleton 15 (e.g., space frame, trussed structure, regular foam, open-cell foam, closed cell foam, etc.) can include: a growth chamber 100, an optical module 200, a light modulator 220, an imaging module 240, an access port for introduction of material precursors 150, and/or other suitable components. The skeleton can be grown on a substrate 17 (where the skeleton and substrate can be made of the same or different materials). The relative position of the substrate (and/or skeleton growing thereon) to the optical input is preferably rearrangeable (e.g., reorientable via translation, rotation, etc. such as using motorized stages for the substrate, for the optical module, spatial light modulator, imaging module, growth chamber, etc.). The skeleton is preferably a trussed skeleton (e.g., where struts, members, branches, etc. of the skeleton form an interconnected network).

Figure 3:
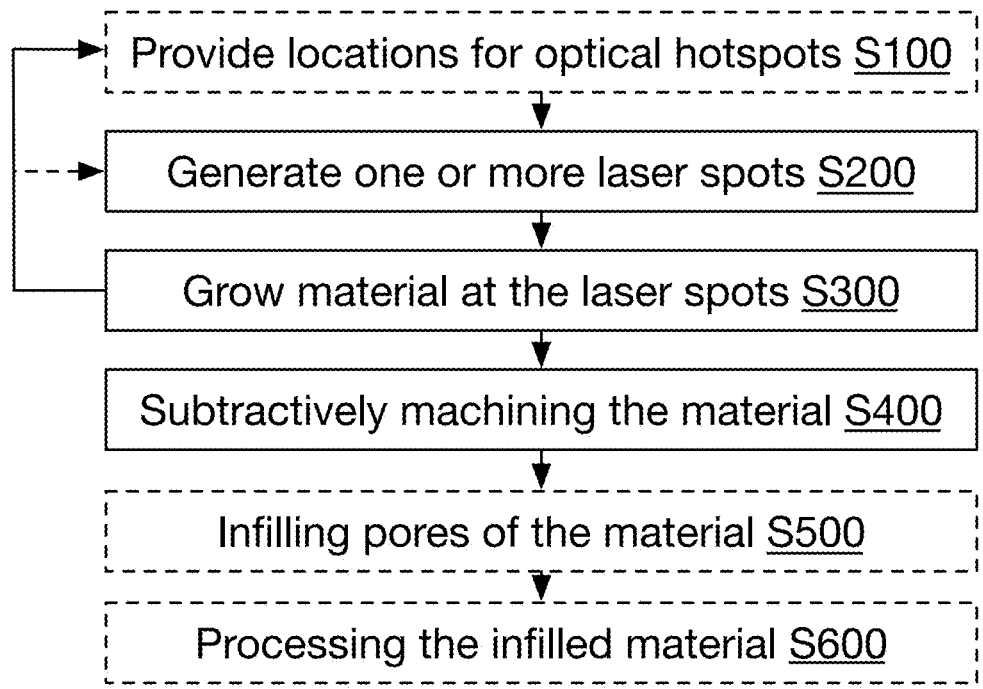
FIG. 3 is a flow chart representation of an exemplary method for forming a material skeleton.

As shown for example in FIG. 3, a method for forming a skeleton (e.g., space frame, trussed structure, regular foam, open-cell foam, closed cell foam, etc.) can include providing instructions for spatial locations of optical hot spots S100, generating the optical hot spots S200, and growing material at the optical hot spots to form the skeleton S300. The method can optionally include infilling the skeleton S400 and/or other suitable steps.

The system and method preferably function to grow a material skeleton (e.g., scaffold, space frame, regular foam, open-cell foam, closed cell foam, sponge, or otherwise describing a porous backbone). The material skeleton can be used as a template for the growth of a second material (that is optionally the same material as that of the skeleton) thereupon. However, the material skeleton can additionally or alternatively function (e.g., be used as a catalyst or catalyst support, be used for sensors, be used as sorbent material, be used as a filter, used for biomimetic applications, for biological grafts, material transport, etc.). The material skeleton is preferably a trussed structure (also referred to as an interconnected lattice structure) where each member (e.g., truss, element, etc.) of the skeleton is in contact with at least one neighboring member. Additionally, or alternatively, planar (inclusive of curved planes) members can be used and/or other suitable lattices can be realized.

2. Technical Advantages

Variants of the technology can confer one or more advantages over conventional technologies.

First the inventors have discovered that the use of trussed structures can enable formation of skeletons with larger footprints (e.g., volumetric footprint) than non-trussed structures (e.g., skeletons where individual members are free-standing or not connected to any nearest neighbors). For instance, the use of trussed skeletons can enable skeletons with footprints exceeding about 1 cm to be formed (in length, width, height, or other suitable dimensions) whereas for non-trussed skeletons, the mechanical forces can result in breaking the members at sizes exceeding about 5 mm.

Second, variants of the technology can enable the formation of the trussed structures. The inventors discovered that a challenge arising from attempting to fuse or sequentially grow members of the skeleton where preexisting members can shadow the formation of subsequent members. To overcome this issue, the inventors have found the simultaneous growth of the skeleton (e.g., realized by using a spatial light modulator to program growth for a plurality of members contemporaneously) can be advantageous.

Third, variants of the technology can enable low-cost, high throughput manufacturing of difficult to machine or otherwise handle materials (e.g., refractories, ceramics, refractory metals and their alloys, etc.) with large footprint (e.g., volumes greater than about 125 mm$^3$).

However, further advantages can be provided by the system and method disclosed herein.

3. Trussed Skeleton

The skeleton can function as a site for growth of deposited material. In variants, the skeleton can also be referred to as a scaffold, former, gauge, template, foam, sponge, and/or space frame (where the respective terms can also be modified to refer to material thereof).

The skeleton is preferably an interconnected array of individual members (e.g., where pieces, portions, layers, trusses, struts, beams, unit cells, etc. of the skeleton are adjoined together). The individual members can be quasi-one dimensional structures (e.g., extruded shapes). The individual members can be straight, angled, bent, curved, sinusoidal, wavy, and/or have any other similar geometry between two ends. The individual members preferably have substantially constant (in shape, size, etc.) cross-section (e.g., through a plane perpendicular to a surface of the individual member at any point along the length of the individual member) between endpoints (e.g., where substantially can accommodate for changes that might occur to enable curvature in the individual member, change by less than about 10%, etc.). The cross-sectional shape of individual members of the skeleton can be round, circular, oval, ellipsoidal, stadium, annular, Reuleaux polygonal, superelliptical or other shape (preferably including rounded segments throughout). A diameter of the cross-section (e.g., major diameter, minor diameter, average diameter, maximum diameter, maximum span, minimum diameter, minimum span, etc.) is preferably between about 3 and 200 µm (e.g., 3 µm, 5 µm, 10 µm, 20 µm, 30 µm, 50 µm, 75 µm, 100 µm, 120 µm, 140 µm, 150 µm, 175 µm, 210 µm, values or ranges therebetween, etc.). Endpoints of an individual member can be free hanging (e.g., connected to nothing), connect to a fusion point, and/or connect to the substrate. The skeleton is preferably a trussed skeleton structure. However, the skeleton can include individual (e.g., disconnected) members and/or other suitable structures.

Figure 14A:
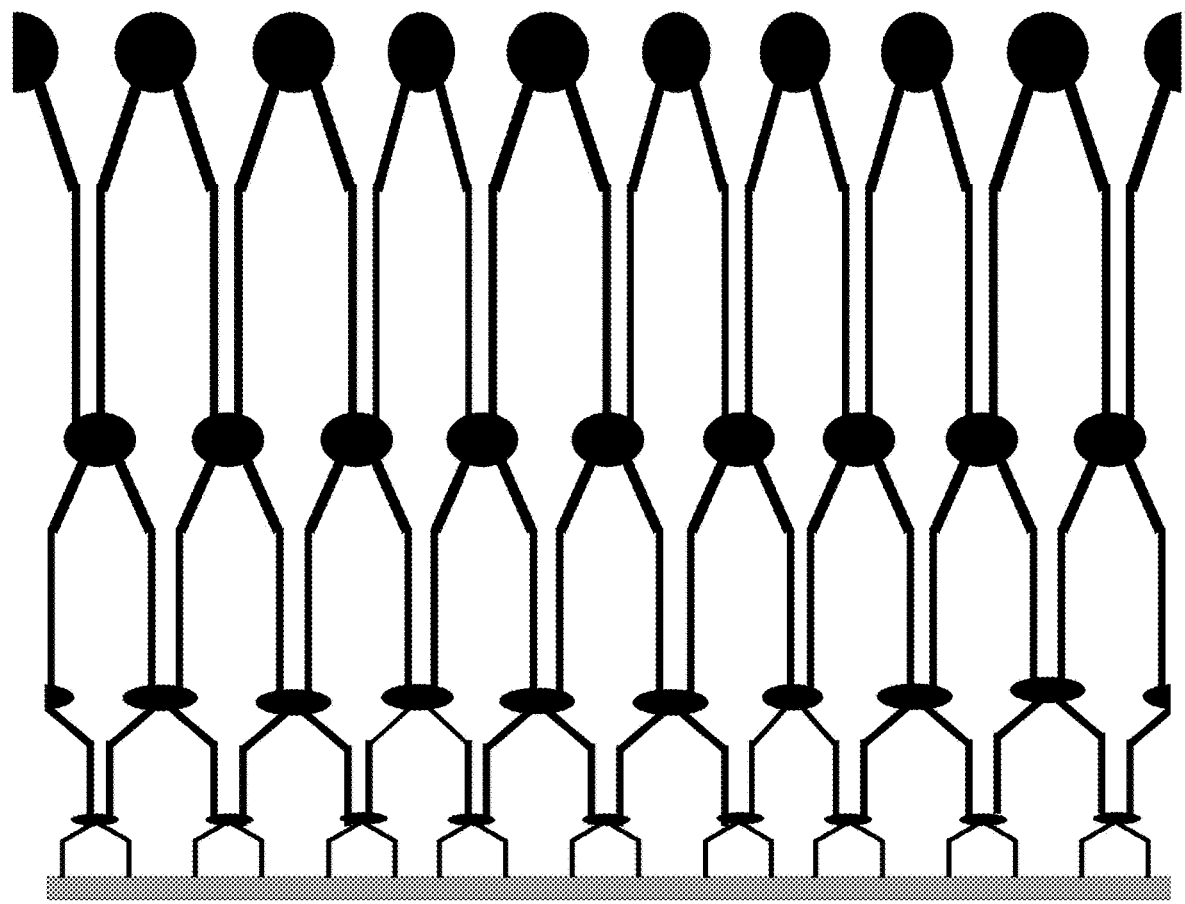
FIGS. 14A and 14B are schematic representations of examples of space frames that include anisotropic pore distributions (e.g., unit cells connected by unit vectors that are functions of distance from the substrate and/or as a function of distance from an edge or corner of a space frame, respectively).
Figure 14B:
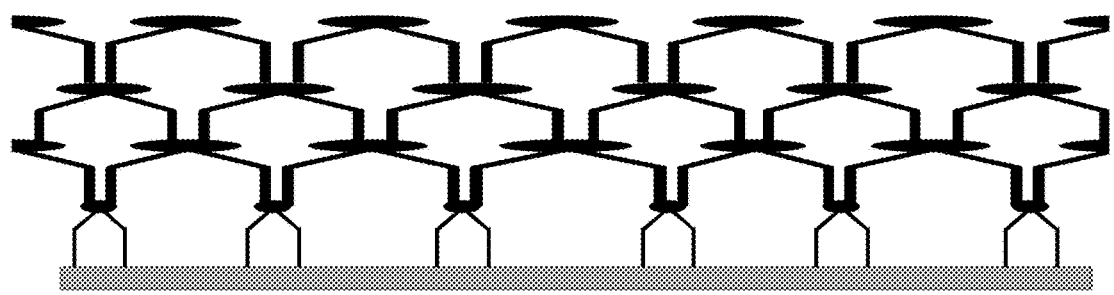

As a specific example, the skeleton can be made of (e.g., comprise, include, consist of, etc.) repeating units (e.g., unit cells, lattices, etc.) where each unit has substantially the same shape. While the term unit cell used here can refer to each unit cell being a substantially identical replica separated by a substantially constant lattice vector, in some variants this need not be true (e.g., the lattice vector can change along the skeleton, the unit cell size can change along the skeleton, as described in U.S. patent application Ser. No. 18/674,463 titled 'METHOD FOR FORMATION OF DIFFICULT-TO-MACHINE MATERIALS AND MATERIALS RESULTING THEREFROM' filed 24 May 2024 which is incorporated in its entirety by this reference, etc.). Alternatively phrased, the trussed skeletons can have a heterogeneous lattice structure (which can be beneficial particularly when material is deposited on the skeleton and may have anisotropic deposition, to impart anisotropic properties throughout the skeleton, etc.) or a homogeneous lattice structure. The heterogeneity can be introduced through the unit cell density, wall thickness, size, material, and/or other suitable skeleton properties. In one specific example, a pore size (e.g., pore gradient) can increase and/or decrease as a function of distance from the substrate (as shown for example in FIG. 14A). In a second example, a pore size (e.g., pore gradient) can increase and/or decrease as a function of distance from an edge or corner of the space frame (as shown for example in FIG. 14B). In a third specific example, a pore size (e.g., pore gradient) can increase and/or decrease radially from a center of the space frame. In a fourth specific example, a pore size (e.g., pore gradient) can increase and/or decrease both perpendicular to the substrate and parallel to the substrate (e.g., both in the growth plane and along the growth plane, i.e., as the space frame is being grown). However, other suitable anisotropies can be introduced.

Figure 2:
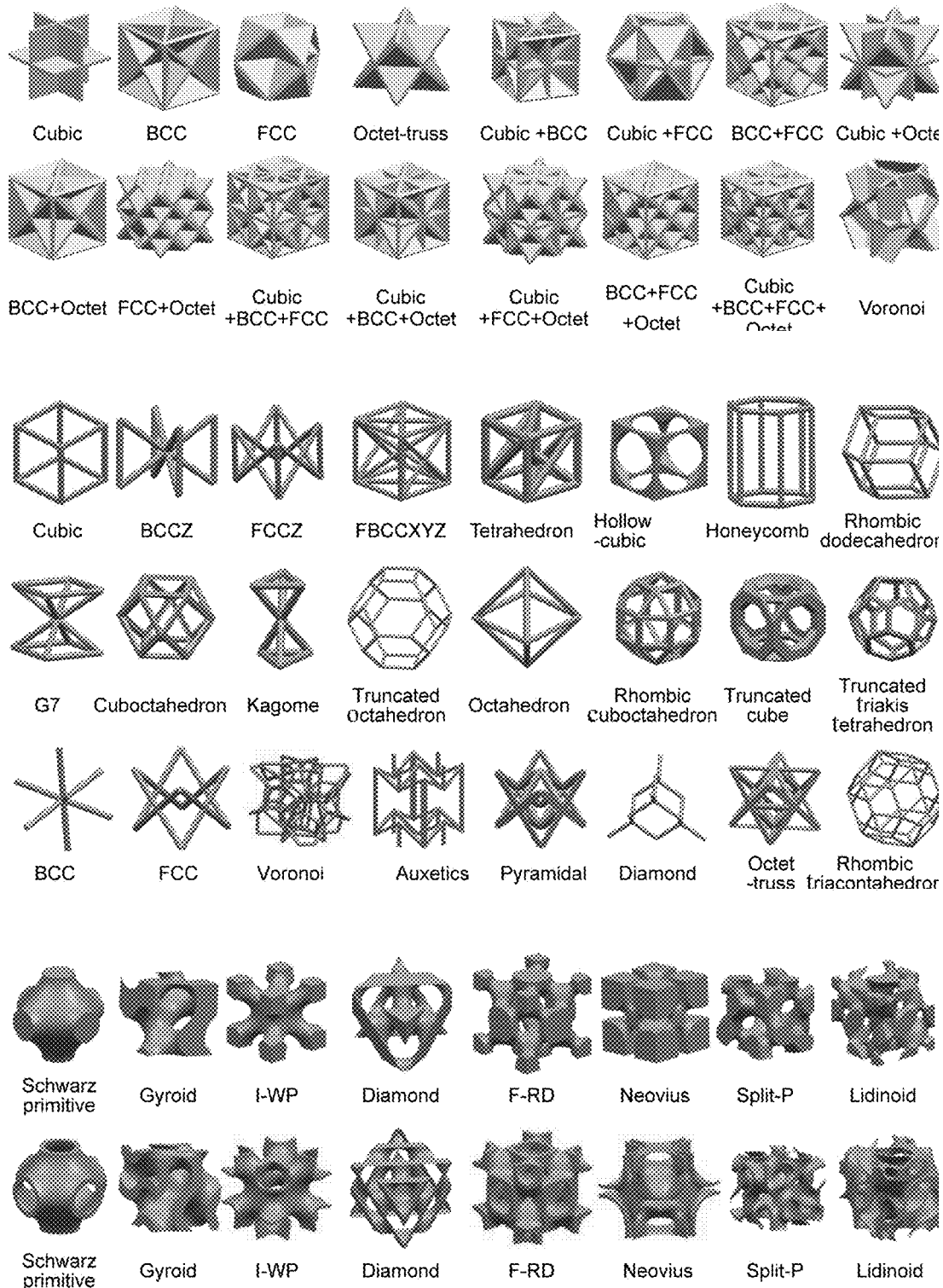
FIG. 2 shows schematic representations of exemplary unit cells for a trussed skeleton (adapted from Zhong et. al. Current Opinion in Solid State and Materials Science Volume 27, Issue 3, 101081).

The lattice structure of the skeleton can include a strut-based lattice (e.g., with a cubic, Z strut body centered cubic, Z strut face centered cubic, face and body centered cubic with horizontal and vertical axis struts, tetrahedron, hollow-cubic, honeycomb, rhombic dodecahedron, G7, cuboctahedron, Kagome, truncated octahedron, octahedron, rhombic cuboctahedron, truncated cube, truncated triakistetrahedron, body centered cubic, face centered cubic, Voronoi, Auxetics or reentrant, foam, pyramidal, diamond, octet-truss, rhombic triacontahedron, truncated deltoidal hexecontahedron, dode thin, truncated tetrakis hexahedron, rhombic icosahedron, truncated triakis octahedron, truncated pentakis dodecahedron, etc. unit structures such as formed using individual members, trusses, cylindrical members, polyhedral members, etc. to form the prescribed shape), a surface based lattice (e.g., singly periodic minimal surfaces, doubly periodic minimal surfaces, triply periodic minimal surfaces, catenoids, helicoids, Schwarz primitive Schwartz Diamond, Schwarz hexagonal, Schwarz crossed layers of parallels, Neovious surface, Enneper surface, Henneberg surface, Bour's minimal surface, gyroid, Saddle tower, Costa's minimal surface, Chen-Gackstatter surface, Schwerk surface, Riemann's minimal surface, Richmond surface, lidinoid, k-noid, Catalan's minimal surface, Schoen surface I-WP, Schoen surface F-RD, Schoen surfaces, combinations thereof, conjugates of the aforementioned surfaces, etc.), a planar-based lattice (e.g., 2D or 2.5D lattices such as a periodic pattern in a 2D plane extruded into an orthogonal direction to create a 3D structure), a plate based lattice (e.g., cubic, body centered cubic, face centered cubic, octet-truss, cubic+body centered cubic, cubic+face centered cubic, body centered cubic+face centered cubic, cubic+octet, body centered cubic+octet, face centered cubic+octet, cubic+body centered cubic+face centered cubic, cubic+body centered cubic+octet, cubic+face centered cubic+octet, body centered cubic+face centered cubic+octet, cubic+body centered cubic+face centered cubic+octet, Voronoi, etc. such as formed using planar members, trusses, etc. to form the prescribed shape), and/or other suitable lattice structure. Exemplary unit cell structures are shown for example in FIG. 2. In a preferred example, the unit cells can be a G7 lattice, a diamond lattice, a body centered cubic with Z strut lattice, and/or a face centered cubic with Z strut lattice.

In some variations (particularly but not exclusively in reference to strut-based lattices), the lattices can be periodic or stochastic lattices (e.g., within a global structure). Related, the lattices can be uniform (or nonuniform) within a design space and/or can conform to a target structure (e.g., global structure).

The spacing (e.g., center to center spacing, wall-to-wall spacing, wall-to-center spacing, center to wall spacing, etc.) between members (e.g., between nearest neighboring structures of a similar structure, between pillars, parallel members, trusses, members, struts, etc.) is typically between 1 µm and 10 mm (e.g., 10 µm, 15 µm, 20 µm, 25 µm, 50 µm, 100 µm, 150 µm, 200 µm, 250 µm, 500 µm, 1 mm, 1.2 mm, 1.5 mm, 2 mm, 2.5 mm, 5 mm, values or ranges therebetween, etc.). Additionally, or alternatively, a spacing between members can be 2-times, 3-times, 5-times, 10-times, 20-times, 50-times, 100-times, 1000-times, and/or other multiple of a size of the member thereof.

The members (e.g., trusses, struts, branches, bones, etc.) are typically cylindrical (e.g., have a circular or elliptical cross-section in a plane perpendicular to a long axis of the structure) or spherocylindrical (e.g., capsule shape, stadium of revolution, frustosphereocylindrical, etc. such as having a stadium or half-stadium cross-section along a plane parallel to a long axis of the skeleton). However, the skeleton members can additionally or alternatively polyhedral, hemicylindrical, prismatic, pyramidal, hemispherical, conical, and/or can have any suitable shape or geometry.

A characteristic size of the members (e.g., trusses, struts, branches, bones, etc.) in a short axis (e.g., perpendicular to a growth axis of the member), such as a diameter of the member, is typically between about 1 µm and 1 mm (e.g., 5 µm, 10 µm, 20 µm, 50 µm, 100 µm, 150 µm, 200 µm, 500 µm, values or ranges therebetween). However, the characteristic size of the short axis may be outside this range (e.g., when greater time for skeleton formation is allowed such as to permit formation of larger fabricated materials, when two or more members meet at a junction or intersection, etc.).

A characteristic size of the members thereof along a long axis (e.g., parallel to a growth axis of the member, a distance between a substrate and a joining region where two or more members intersect or are joined together, etc. such as a layer height) can be between about 100 µm and 10 mm. This height is typically limited by the material's ability to remain freestanding without breaking. However, the characteristic size of or along the long axis may be outside this range (e.g., a taller cylinder may be possible with thicker skeleton structure, based on material properties larger values may be achievable, etc.).

A separation distance between members (e.g., the distance between a first joint and a second joint of the skeleton structure when a separate joining layer is included), is typically less than about 5 mm (e.g., 100 µm, 150 µm, 200 µm, 500 µm, 1000 µm, 1500 µm, 2000 µm, 2500 µm, 3000 µm, 4000 µm, values or ranges therebetween, etc.).

The skeleton can be made of carbon (e.g., sp2 carbon, graphite carbon, polymers, amorphous carbon, diamond, diamond-like carbon, graphitizing carbon, non-graphitizing carbon, etc.), boron, alkali metals, alkaline earth metals, transition metals, refractory metals (e.g., titanium, vanadium, chromium, zirconium, niobium, molybdenum, ruthenium, rhodium, hafnium, tantalum, tungsten, rhenium, osmium, iridium, alloys therebetween), refractories (e.g., carbides, borides, sulfides, nitrides, oxynitrides, oxycarbides, silicides, carbonitrides, oxyborides, oxysilicides, borocarbides, borosilicides, borosulfides, etc. of metals), ceramics, cermets, and/or other suitable materials.

The skeleton is typically formed on a substrate. However, the skeleton can be freestanding (e.g., the substrate and skeleton can be the same). The substrate is preferably made from a material that can readily separate from the fabricated material (e.g., mechanically removed, chemically removed, etc.), can withstand a laser-controlled deposition process (e.g., can withstand localized surface heating to temperatures between about 1000° C. and 2000° C. without melting, vaporizing, buckling, warping, deformation, etc.), can absorb light of a specific wavelength (e.g., matching a wavelength of a laser), form bonds with the skeleton material, has a low thermal conductivity (e.g., to facilitate starting deposition of the precursor; however, in some variants it can be advantageous to have good thermal conductors, for instance to exchange heat between process gas and the substrate, where in these variants the initiation of deposition can be facilitated by using an absorptive coating and/or higher initial laser intensity), and/or can have other suitable properties. In different variants, the substrate can either act as a site for growth of deposited material or can act as a poor site for growth of deposited material. In different variants the substrate can be integrated as part of the final product. Examples of substrates include carbonized paper, graphite, titanium, carbidized titanium, alumina-silicate ceramics, silicon, silicon carbide, carbon (e.g., graphitic carbon), quartz, diamond, mica, metals (e.g., stainless steel, brass, bismuth, manganese, bronze, copper, aluminium, etc.), refractory metals (e.g., tungsten, molybdenum, tungsten, osmium, hafnium, etc.), ceramics or alloys derived therefrom (such as carbides, oxides, nitrides, borides, silicides, etc. of refractory metals), arsenic, aluminium nitride, and/or other suitable materials.

The skeleton can be grown on a single side (e.g., single broad face) of a substrate and/or on a plurality of broad faces of the substrate.

In some variants, the skeleton can include (e.g., be grown in) a plurality of layers, where a first layer is grown and a subsequent layer is grown on top of the first layer. In some examples of these variants, a first layer can include one or more discrete members where the members can be connected by a joining layer. In this example, a subsequent layer can then be grown on top of the joining layer.

Figure 8A:
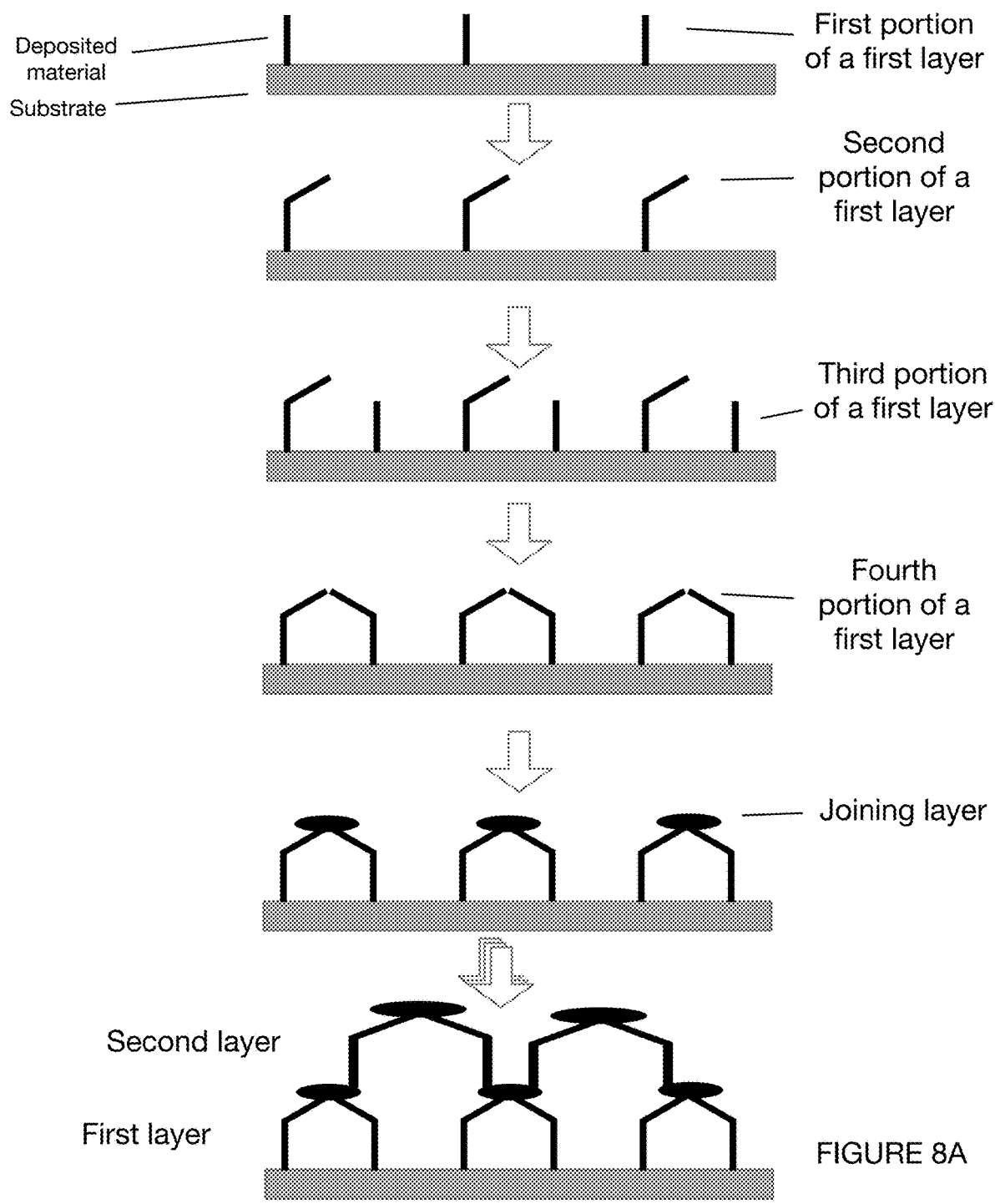
FIGS. 8A, 8B, and 8C are schematic representations of examples of forming a space frame structure that includes forming the space frame as a plurality of layers, where each layer is formed using a plurality of steps.
Figure 9:
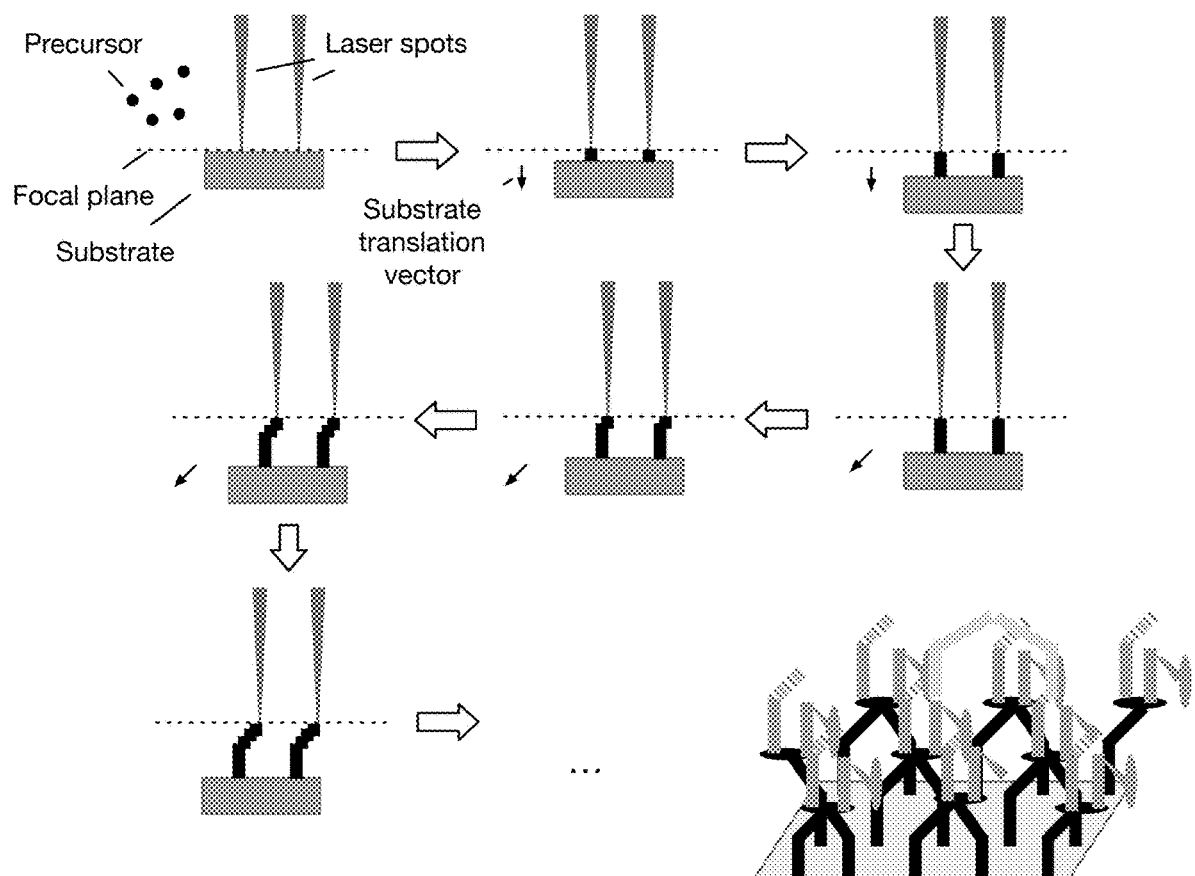
FIG. 9 is a schematic representation of an example of forming a space frame structure by keeping a focal plane and/or incident irradiation pattern substantially fixed while translating a substrate relative to the focal plane.
Figure 10:
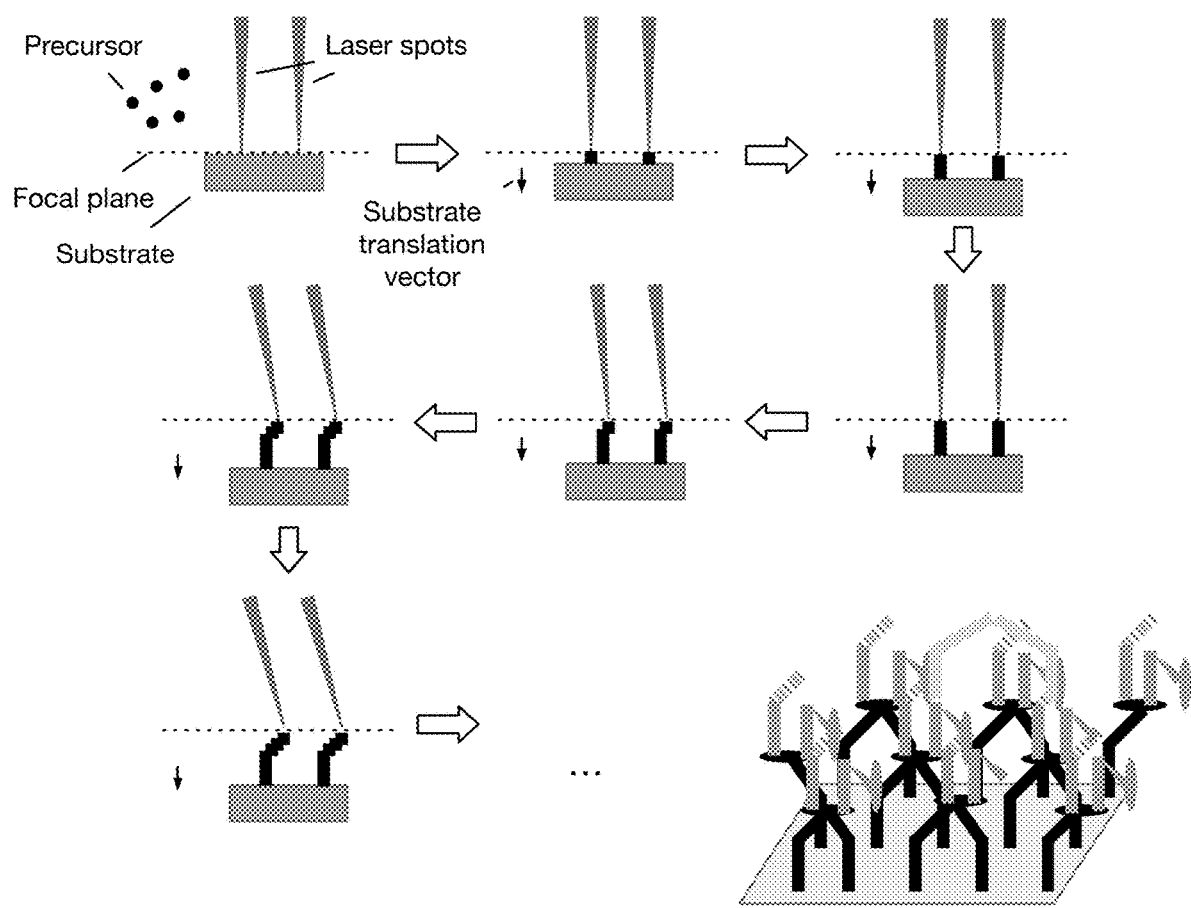
FIG. 10 is a schematic representation of an example of forming a space frame structure by translating a substrate along an axis parallel to a laser propagation axis and changing an irradiance pattern at a focal plane of a laser.
Figure 11:
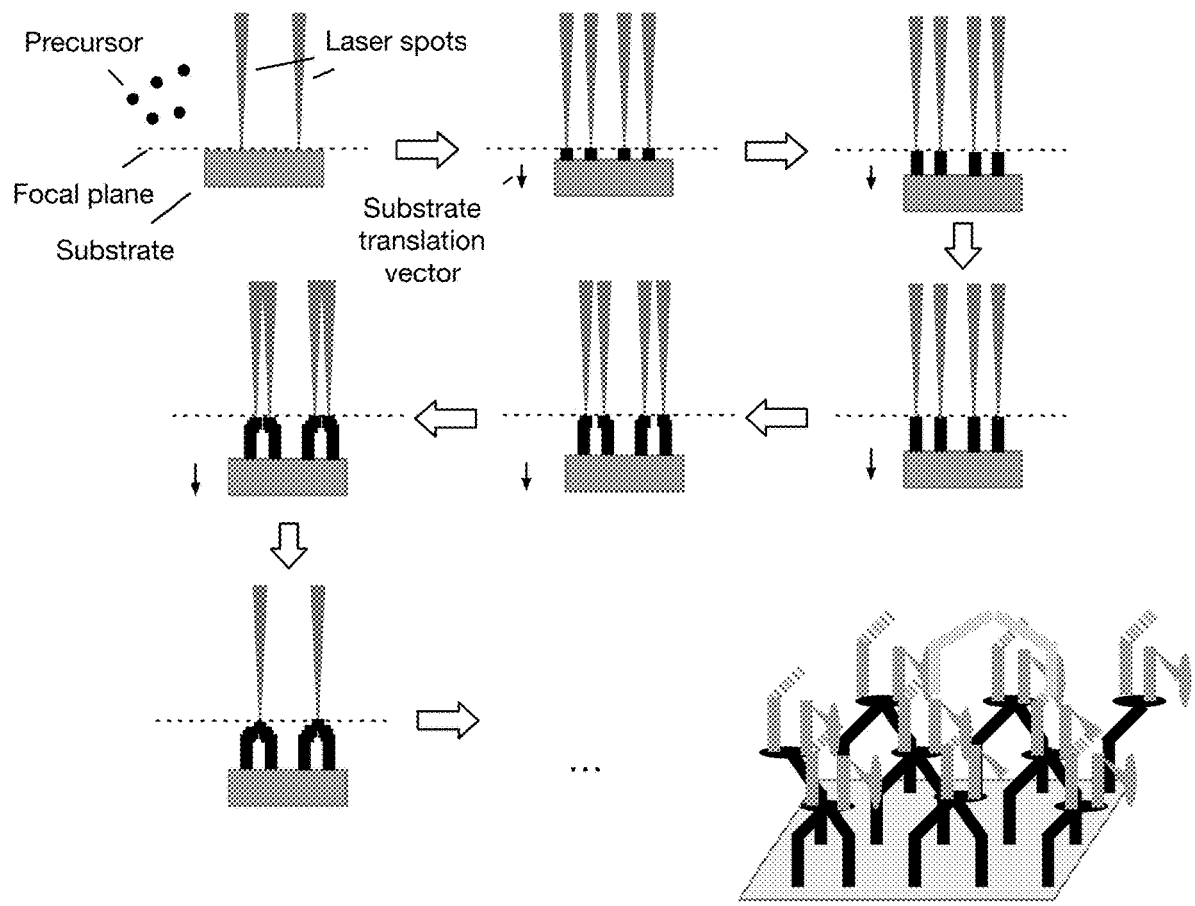
FIG. 11 is a schematic representation of an example of forming a space frame structure by translating a substrate along an axis parallel to a laser propagation axis and changing an irradiance pattern at a focal plane of a laser.
Figure 12:
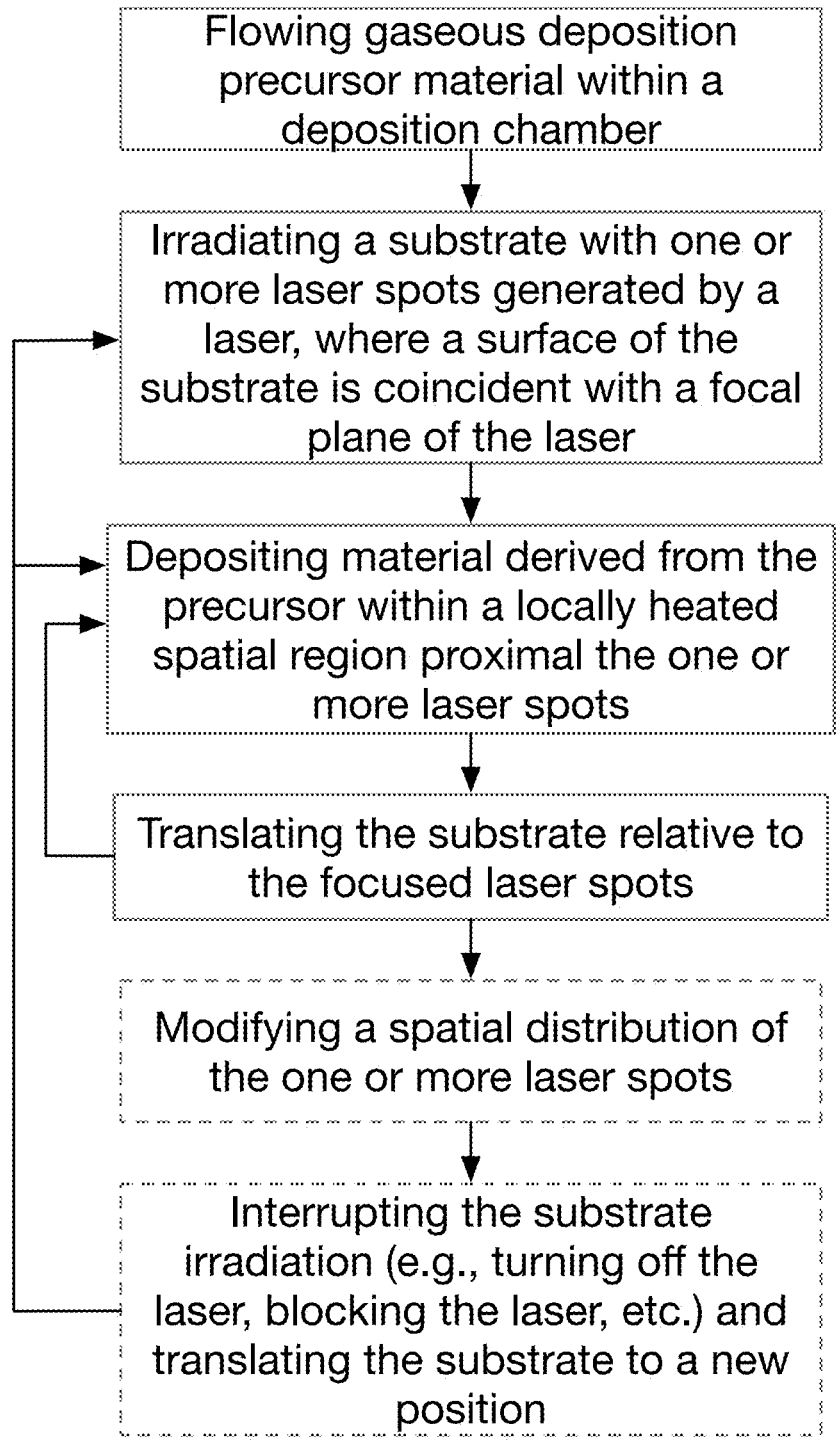
FIG. 12 is a flowchart representation of an example of a method.

In variants where the skeleton includes a plurality of layers, each layer can have the same orientation and/or can have different orientations. For example, as shown in FIG. 8A, a first layer and a second layer can be formed substantially in the same plane. As another example (as shown for instance in FIG. 9 or FIG. 10), a first layer and an adjacent layer can be grown in substantially orthogonal directions. However, adjacent layers can have any suitable orientation (e.g., intermediate angles can be achieve particularly depending on an arrangement of a unit cell).

In variants where a skeleton includes separate members that are joined together, the members can be joined using the skeleton material (e.g., by depositing additional skeleton material overlapping voids or spaces between the adjoining members), using a second skeleton material (e.g., from exemplary skeleton materials above), using an adhesive, mechanically support one another (e.g., by causing the individual members to contact one another such as by shrinking a substrate), and/or can otherwise be joined together. In examples where skeleton material is used for joining, the joint can be a point joint (e.g., welded only over the gap where the members are not contacting) and/or an areal or volumetric joint (e.g., forming additional material in a region or plane overlapping the gap between members). In variations (e.g., particularly where an areal or volumetric joint is used as further distinct members can be formed without interfering with growth of each other), the joint can act as a surface where subsequent layers are formed (as shown schematically for instance in FIG. 8A).

In variants where a skeleton includes separate members that are joined together, any suitable number of distinct members can be joined at a gap. For instance (as shown for example in FIG. 8A, FIG. 9, FIG. 10, or FIG. 11), 2 distinct members (from a given layer) can be joined at a gap. However, additionally or alternatively, 3 distinct members (e.g., to form a triangular unit cell), 4 distinct members (e.g., to form a square, rectangular, quadrilateral, G7, tetrahedral, etc. unit cell), 5 distinct members (e.g., to form a pentagonal unit cell), 6 distinct members (e.g., to form a hexagonal unit cell), and/or other suitable number of distinct members can be joined over a gap. Typically the distinct members will be symmetrically arranged (e.g., an angle between each member of the n distinct members is approximately 360°/n). However, the distinct members can be asymmetrically arranged.

Figure 13A:
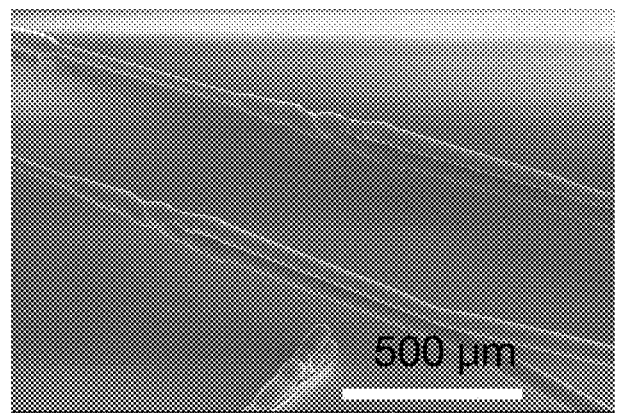
FIGS. 13A-13C are scanning electron micrograph images of exemplary skeleton fibers (e.g., members) including fusion points.
Figure 13B:
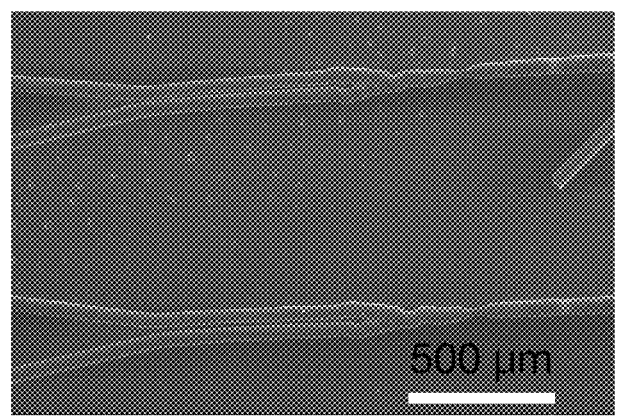
Figure 13C:
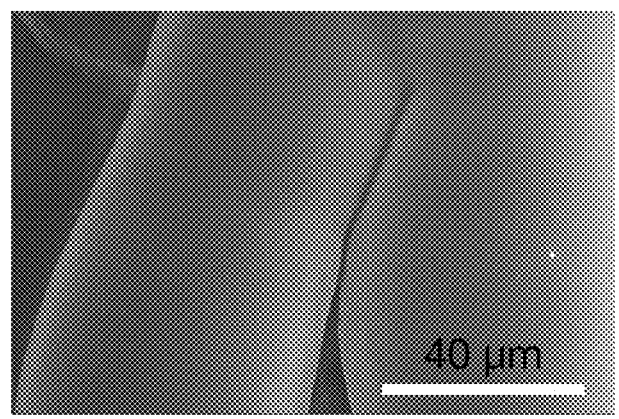

The skeleton surface is preferably smooth and continuous (e.g., does not include sharp members such as can occur from reticulated vitreous carbon foams, as shown for example in FIG. 13A, FIG. 13B, or FIG. 13C), which can provide a technical advantage (e.g., over 3D printing from powder feedstocks or foam preparation techniques which cannot result in smooth surfaces) as roughness in the surface and/or sharp features (e.g., discontinuities in a first derivative of a surface contour) can result in stress concentration points (and/or other failure points in the resulting foams). As one measurement of smoothness, an arithmetic or quadratic roughness average of surfaces of the skeleton is preferably less than about 10 μm. As one measurement of continuous, a cross-section shape of individual members of the skeleton can be round (e.g., have no vertices) for a perimeter of the entire cross-section (e.g., circular, oval, ellipsoidal, stadium, annular, Reuleaux polygonal, superelliptical etc.).

A porosity of the skeleton (e.g., defined relative to a convex hull, bounding volume surrounding the entirety of the external structure, etc.) is typically between 90% and 99.99%. Alternatively described, a density of the skeleton is between 0.000001% and 10% of a density for a fully densified solid formed from the skeleton material. As another equivalent definition, a fraction of a volume of a unit cell of the skeleton occupied by the deposited material (e.g., refractory material) is between 0.000001% and 10%. Note that the members of the skeleton are preferably not porous, but rather the porosity results from void spaces formed between members. However, in some variants, the members can themselves also be porous (e.g., formed by inclusion of sacrificial material within the members that can subsequently be etched away).

4. Growth Chamber

The growth chamber 10 preferably functions to grow or form the skeleton 15. The growth chamber is preferably a laser-assisted chemical vapor deposition chamber (e.g., a reactor as described in U.S. patent application Ser. No. 19/114,199 titled 'LASER OBJECT PRINTING FROM A GASEOUS SUBSTRATE' filed 21 Mar. 2025 which is incorporated in its entirety by this reference). However, additionally or alternatively the growth chamber can include a thermally-assisted chemical vapor deposition chamber (e.g., a CVD chamber that includes a local heating element, local heating source, etc. that can provide local portions of increased temperature where deposition occurs), and/or other suitable growth chambers (e.g., tube furnace, furnace, plasma chamber, etc. such as where material precursors can be introduced at predetermined locations).

As shown for example in FIG. 1, the growth chamber can include: an optical module, a light modulator, an imaging module, an access port for introduction of material precursors, and/or other suitable components.

The volume, configuration, operating conditions, and other properties of the growth chamber(s) can depend on the fabricated material (e.g., skeleton, deposited material, size of the target object, etc.).

The access port preferably functions to introduce (and/or remove) material precursors (while achieving target chamber operating parameters such as chamber pressure, flow rates, etc.). The growth chamber can include a single access port (where an upstream manifold or other system can switch what precursor(s) are introduced) and/or a plurality of access ports (e.g., an access port for each precursor, an access port for each material to be formed, a vacuum access port and material access ports, etc.).

Exemplary precursors that can be used for carbon deposition (e.g., for graphite, to provide carbon for carbide formation, etc.) include: alkanes (e.g., methane, propane, etc.), alkynes (e.g., acetylene, propyne, etc.), alkenes (e.g., propylene, ethylene, etc.), aromatics (e.g., benzene, naphthalene, toluene, etc.), combinations thereof, and/or other suitable hydrocarbons. Exemplary precursors for silicon carbide include: organosilicon compounds (e.g., methyltrichlorosilane, tris(trimethylsilyl)silane, etc.), inorganic silicon (e.g., silicon tetrachloride, silane, silicon tetrabromide, silicon tetraiodide, etc.), hydrocarbons (e.g., alkanes such as methane, propane, etc.; alkynes such as acetylene, propyne, etc.; alkenes such as propylene, ethylene, etc.; aromatics such as benzene, naphthalene, toluene, etc.; combinations thereof; etc.), combinations thereof, and/or other suitable precursors. Exemplary precursors for refractory metals (M) include: chlorides (e.g., $MCl_x$ such as $TiCl_3$, $TiCl_4$, $MoCl_5$, $NbCl_5$, $TaCl_5$, $WCl_6$, etc.), bromides (e.g., $MBr_x$ such as $TiBr_3$, $TiBr_4$, $MoBr_5$, $NbBr_5$, $TaBr_5$, $WBr_6$, etc.), iodides (e.g., $MI_x$ such as $WI_6$, $ZrI_3$, $ZrI_4$, $HfI_3$, $HfI_4$, etc.), fluorides ($MFx$ such as $WF_6$), metal-organics, carbonyls ($M(CO)_x$ such as $Mo(CO)_6$, $W(CO)_6$, etc.), and/or other suitable species. Exemplary precursors for boron (and/or boron inclusion) include: boranes (e.g., di-borane), borohalides (e.g., boron trichloride, boron trifluoride, boron tribromide, boron triiodide, etc.), and/or other suitable boron sources (e.g., organoborides). Exemplary precursors for nitrogen inclusion include: nitrogen ($N_2$), ammonia, organonitrogen compounds (e.g., amines, amides, nitroso, imines, etc.), and/or other suitable nitrogen precursors. To form binary, trinary, quaternary and/or higher order mixtures of materials, precursors from the above can be combined. As an illustrative example, titanium carbide can be deposited by using a precursor that includes a combination of one or more titanium precursors and one or more carbon precursors (e.g., in a ratio that depends on the reaction rate for the respective precursors, target composite composition, mean free path length for the precursors, pressure, temperature, etc.). Similar combinations (and considerations) apply to form other materials. The precursors can optionally include a carrier gas (e.g., an inert gas such as a noble gas like He, Ne, Ar, Kr, Xe, etc.; a carrier that does not react in the operating conditions such as carbon dioxide or nitrogen; etc.), scavenger(s) (e.g., hydrogen gas which can function to scavenge counterions that are not deposited such as to capture chlorine atoms in chlorine processes where scavengers are typically provided in excess in the variants that include them), and/or other suitable species.

Operating parameters for the growth chamber include: precursor(s), temperature, pressure (e.g., partial pressure of deposition precursors), flow rate, growth time, plasma presence, and/or other suitable properties. The operating parameters are typically tuned based on the target material to deposit (e.g., for the skeleton material, for the infill material, for the deposited material, etc.). However, the same operating parameters can be used for many different target materials.

For example, the temperature (e.g., local temperature resulting from laser heating, local heating mechanism, substrate temperature, skeleton temperature, precursor temperature, etc.; growth chamber temperature; etc.) is typically between about 500° C. and 4000° C. Relatedly, the pressure is typically between 10 torr and 7600 torr (e.g., about 10-760 torr, about 1-10 bar, etc.). However, any suitable temperature or pressure can be used.

The growth rate for material is typically between about 100 μm/hr and 50000 mm/hr (e.g., 100 μm/hr, 150 μm/hr, 200 μm/hr, 250 μm/hr, 500 μm/hr, 1 mm/hr, 2 mm/hr, 5 mm/hr, 10 mm/hr, 15 mm/hr, 20 mm/hr, 50 mm/hr, 100 mm/hr, 150 mm/hr, 200 mm/hr, 250 mm/hr, 500 mm/hr, 1000 mm/hr, 2000 mm/hr, 5000 mm/hr, 10000 mm/hr, 20000 mm/hr, 50000 mm/hr, values or ranges therebetween, etc.).

The optical module preferably functions to produce hot spots (e.g., local regions of heighten temperature such as achieving the aforementioned temperatures) where precursors can be deposited (e.g., to form the skeleton). The optical module is preferably a laser module (e.g., including one or more laser). However, additionally or alternatively, the optical module can include a high intensity discharge lamp (e.g., mercury-vapor lamp, metal-halide lamp, ceramic lamp, sodium vapor lamp, xenon short-arc lamp, etc.) and/or other light source(s) that produce sufficient intensity of light (e.g., with appropriate imaging optics to capture and transmit the light to the substrate or growing skeleton).

In variants that leverage laser modules, a single laser or a plurality of lasers can be used. Examples of lasers include: gas lasers, chemical lasers, dye lasers, metal-vapor lasers, solid-state lasers, fiber lasers, semiconductor lasers, free electron lasers, gas dynamic laser, Raman laser, polariton laser, plasmonic laser, phonon laser, and/or other suitable laser technology (e.g., based on target wavelength, target hot spot size, target skeleton wall thickness, etc.).

The laser can operate in continuous-wave and/or pulsed operation modes (e.g., with pulse lengths on the order of ms, ns, ps, fs, as, etc.). When operated in a pulsed mode, the pulse repetition rate is often between 10 Hz and 100,000 Hz. However, any suitable pulse repetition rate can be used. When operated in a pulsed mode, the duty cycle is often between 1% and 90%. However, any suitable duty cycle can be used.

The wavelength of the laser is preferably absorbed by the substrate and/or skeleton material. However, the laser wavelength could be reflected or transmitted through the substrate or the skeleton material. Additionally, or alternatively, the wavelength can also impact the feature size of the skeleton (e.g., in the best-case situation, a diffraction limited spot could be formed resulting in a skeleton characteristic size approximately equal to the diffraction limited spot). In one specific example, a neodymium laser (e.g., Nd:YAG, Nd:YLF, Nd:glass, ND:YVO, Nd:YCBO, etc.) producing laser light with a wavelength of approximately 1060 nm (or a harmonic thereof such as about 530 nm, about 350 nm, about 215 nm, etc.). The intensity of the laser is preferably sufficient to achieve a target local temperature (e.g., 1000° C.-2500° for carbon deposition as a specific example, other temperatures can be achieved for other materials). The intensity can depend on the wavelength of the laser, substrate material (e.g., absorption coefficient of the substrate at the laser wavelength, thermal diffusion constant, etc.), and/or other suitable properties.

The laser is preferably a single mode laser. However, a multimode laser could be used (e.g., using an aperture to improve a mode of the laser, accommodating for increased spot size as multimodal outputs can be difficult to focus tightly etc.).

The laser power (e.g., per optical spot) is typically between about 1 mW and 10 W (e.g., 1 mW, 2 mW, 5 mW, 10 mW, 20 mW, 50 mW, 100 mW, 200 mW, 500 mW, 1000 mW, 2000 mW, 5000 mW, 10000 mW, etc.). However, higher or lower optical spot laser power can be used (e.g., based on a substrate, deposition precursor, etc.).

However, other suitable laser(s) can be used.

The light modulator functions to modify the light output by the optical module. For instance, the light modulator can modify the phase, intensity, propagation direction, polarization, and/or other suitable properties of the output light. The light modulator can be a static optic (e.g., a diffractive optical element (DOE), a refractive optical element, etc.) and/or a dynamic optic (e.g., an SLM, AOM, etc.). In some variations, a static optic can be mounted to a rotational or translation stage to result in a dynamic change (e.g., a change in orientation of the output laser irradiation).

In variants where the light modulator is a spatial light modulator (or other device that can change the phase, intensity or both such as acousto-optic modulators, MEMS mirrors, etc.), the spatial light modulator (SLM) can change a single incident light beam into a plurality of light beams (e.g., propagating in different directions that are programmed, controlled, etc. by the SLM settings such as particular phase shifts applied to pixels of an LCD SLM, by the position or orientation of diffractive elements, etc.).

Figure 4:
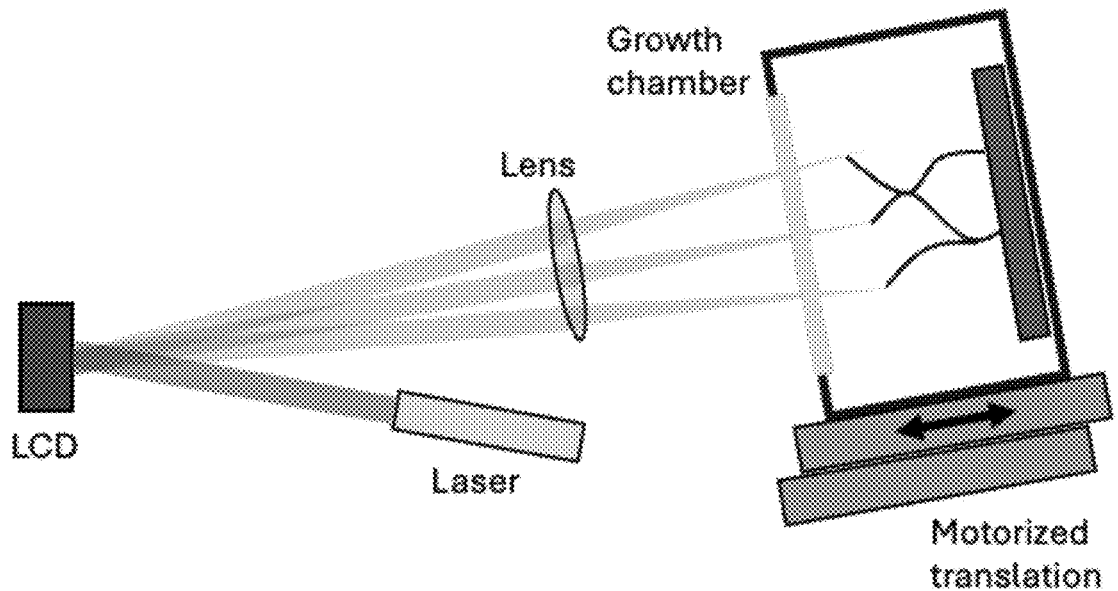
FIG. 4 is a schematic representation of an exemplary system.

The SLM can be reflective (as shown for example in FIG. 4) and/or transmissive.

The SLM is preferably a liquid crystal-based device (LCD). LCD SLMs can be beneficial as they have sufficiently high update rates, high diffraction efficiencies, high tunability (e.g., ability to generate complex light forms), cost effective, and/or other beneficial properties. As a specific example LCD, an LCD can include 1-10 megapixels, where each pixel can have a pixel pitch 1-10 μm. However, any suitable LCD can be used. Additionally or alternatively, a deformable mirror (e.g., microelectromechanical system (MEMS)), acousto-optic modulator (AOM), diffractive plates (e.g., a plurality of distinct diffractive plates that can be switched between, a diffractive plate that can be moved to result in changes in the light propagation, etc.), and/or other suitable optical elements can be used.

In some variants, a plurality of SLMs can be used. In related variants, an SLM can be used in combination with one (or more) light splitters (e.g., beam splitters, diffraction gratings, diffractive beam splitter, etc.). In these variants, the plurality of SLMs and/or the combination of an SLM with beam splitters can enable the simultaneous formation (and control over) a greater number of beams than a single SLM may enable (e.g., enabling more complex skeleton formation, enabling skeleton formation over a larger spatial area as a single SLM is typically limited to an addressable range equivalent to about 4°, etc.).

In some variants that include a plurality of SLMs, the plurality of SLMs can be reoriented relative to one another (e.g., during skeleton growth). As a specific example, a beamsplitter (e.g., diffraction grating, diffractive beam splitting optic, etc.) can be rotated to rotate a laser pattern generated by a liquid crystal spatial light modulator to form a helical skeleton (as the beam splitter rotates, the hot spots rotate in turn thereby resulting in formation of a helical structure). Additionally, or alternatively, translation of the beamsplitter can be used to form translated structures (in addition to or alternative to twisting or helical structures).

Figure 5:
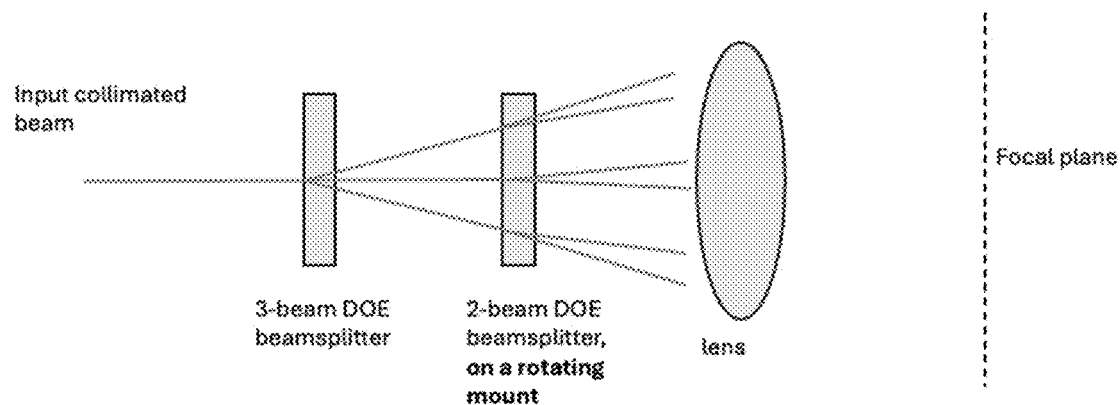
FIG. 5 is a schematic representation of an exemplary system using only statically diffractive optical elements to form a trussed skeleton.
Figure 6:
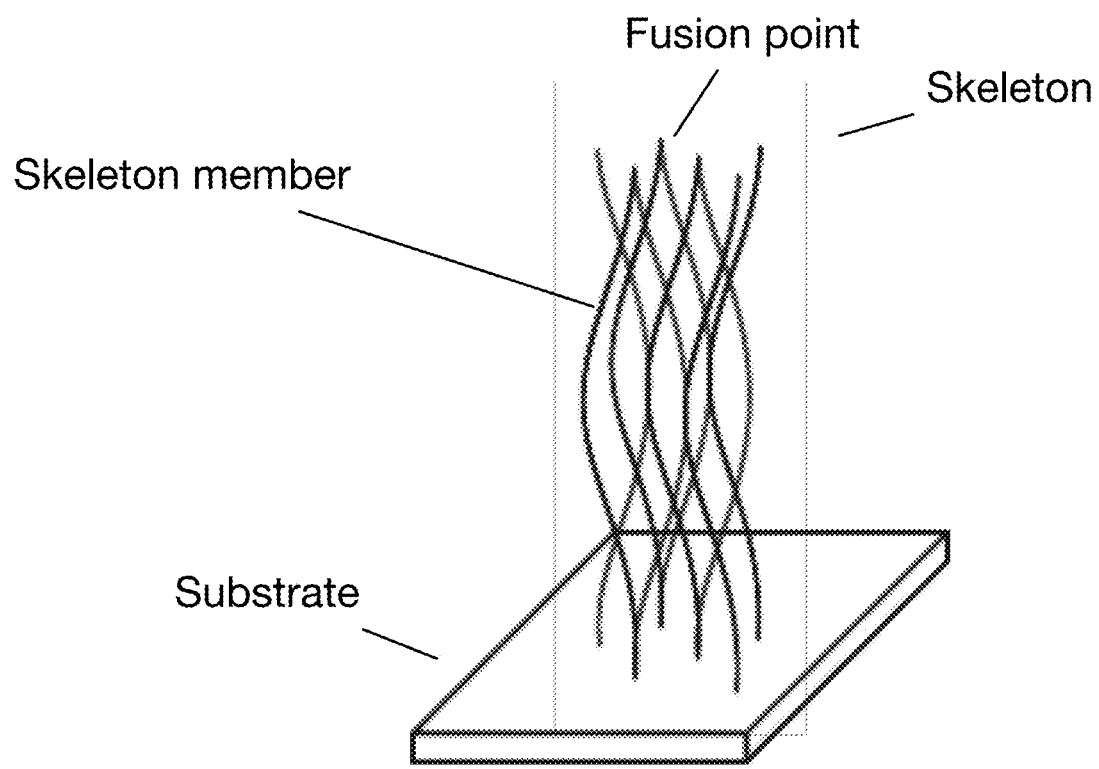
FIG. 6 is a schematic representation of an exemplary braided skeleton (e.g., formed by rotating one of the diffractive optical elements in FIG. 5 concurrently with a relative translation between the substrate and the light beam).
Figure 7:
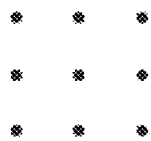
FIG. 7 is a schematic representation of exemplary light beams on a focal plane formed by diffractive optical elements and by a light beam passing through a pair of optical elements where the second optical element is rotated by differing amounts.
Figure 7:
Figure 7:
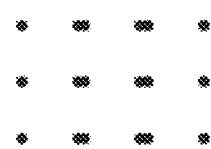
Figure 7:
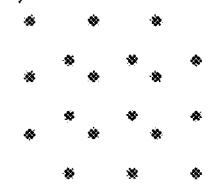

In another variant, a spatially modulated beam can be formed without using individually addressable elements (e.g., without using an LCD SLM, a pixelated or effectively pixelated SLM, as shown for example in FIG. 5, etc.). For instance, a light beam can be split into a plurality of light beams by a diffractive optical element (e.g., diffraction grating), where that diffractive optical element can be rotated such that the spatial positions of the light beams (e.g., laser spots) varies. The rotation can be in a single direction (e.g., rotation about an axis parallel to a light propagation axis to form helical or braided skeleton). In variations, additional a plurality of diffractive optical elements (DOE) can be used. For example, a first DOE can split the input optical beam into a plurality of optical beams and a second DOE can split each optical beam of the plurality of optical beams into a second plurality of optical beams (e.g., multiplicative increase in the number of beams formed by the DOE, as shown for example in FIG. 7, etc.). In this example one DOE (typically the second) can be rotated (e.g., about an axis parallel to a propagation direction of the optical beam resulting in rotation of the sublattices formed from each of the second plurality of optical beams to form a plurality of braided skeleton unit cells, as shown for example in FIG. 6). Additionally, or alternatively, the first DOE can be rotated (e.g., about an axis parallel to a propagation direction of the optical beam to generate braiding between the sublattices).

In some variants, a plurality of diffractive optical elements can be used (e.g., to correct for, compensate for, etc. chromatic dispersion).

In these (and preceding) variants, the pitch of the helical structure can be controlled by the DOE (e.g., diffraction angle), the rotation speed, and/or by any suitable property.

In yet other variants, a static diffractive optical element (e.g., reflective or transmissive diffraction grating) can be used. In these variants, changes in the skeleton structure as grown can be produced by translating the substrate relative to a focal plane of the laser spots.

The light modulator preferably forms the incident laser light into a target array of laser spots. The array of laser spots is generally two-dimensional (e.g., includes a plurality of laser spots distributed in the x-y plane of the focal plane). However, the array of laser spots can be one-dimensional (e.g., include a row or column of laser spots). Each laser spot typically has substantially the same intensity (e.g., to facilitate uniform growth). However, in some variants, different laser spots can have different intensity (e.g., to mitigate cross-talk between laser spots, based on a feedback loop, to produce skeletons or members with target differences within a unit cell such as thinner members and thicker members, etc.). As one illustrative example, a DOE can split a single incident laser beam into a 6×6 or an 8×8 grid of laser spots (i.e., into 36 or 64 separate and distinct laser spots, respectively). However, the DOE can split the single incident laser beam into any suitable spots (e.g., between 2 and 1000 laser spots).

In some variants, the light modulator can include one or more laser actuator (e.g., galvanometer, mechanical mirror, beam steering optical, etc.) that can function to produce a change in the spatial location of the laser spots on the focal plane (e.g., a global change that applies to all of the laser spots translating in the same direction, a change in position within the focal plane that is applied to one or a subset of the laser spots but not all of the laser spots). Typically, the laser beam will be actuated prior to forming the plurality of laser spots (e.g., prior to entering the diffractive optical element that produces the plurality of laser spots). However, in some variants, one or more laser spots can enter the laser actuator after the diffractive optical element.

The imaging module functions to image (e.g., focus, collimate, etc.) the light onto a focal plane (where the focal plane is typically substantially coincident with a location of deposition for the deposition precursor such as the substrate and/or skeleton). The imaging module is preferably downstream, relative to a light propagation direction, of the light modulator. However, the imaging module can be coincident with the light modulator (e.g., between a first and second SLM, between an SLM and beamsplitter, integrated into the SLM, etc.) and/or upstream relative to the light propagation direction of the light modulator. The imaging module is preferably a lens (e.g., convex lens, planoconvex lens, Fresnel lens, telecentric lens which can be technically advantageous for facilitating perpendicular fiber or member growth behind adjacent axial fiber or members, f-theta lens, etc.). However, additionally or alternatively, mirrors and/or prisms can be used. The focal length of the imaging module is typically between about 50-200 mm. However, other suitable focal length imaging optics can be used.

In a preferred variant, the optical module (e.g., the laser, galvanometer, diffractive optic, light modulator, lens, etc.) can be moved (e.g., translated relative to the substrate, deposition chamber, etc.). However, in some variants, the optical module can be fixed.

In some variants, the optical module can include one or more light attenuator, which can function to attenuate the light intensity. Examples of light attenuators include: waveplate and polarizer, pair of polarizers (with variable relative orientation), neutral density filters (e.g., variable neutral density filters, graduated neutral density filters, etc.), variable beamsplitters (e.g., Glan-Taylor polarizers), and/or other suitable attenuation mechanisms (e.g., attenuating the amount of power provided to the optical module) can be used. The light attenuator can be used to block one or more laser spots (e.g., to hinder growth at the laser spot, to enable movement of the substrate and/or skeleton without deposition of deposition precursor, etc.). Additionally or alternatively, the laser itself can be attenuated and/or tuned (e.g., turned on and off) to attenuate the laser spot intensity.

The optical elements are preferably arranged substantially perpendicularly to the substrate. However, the optical elements can form any suitable angle relative to the substrate (including being parallel).

As one illustrative example, an optical module can include: a single-mode laser whose output laser beam passes through a 2-axis galvanometer (which can rapidly steer the beam in its two axes). In this example, after the beam exits the galvanometer it enters a diffractive optical element (e.g., N×N beamsplitter, where N is an integer between 4 and 100) to produce $N^2$ laser spots. These $N^2$ laser spots then pass through an F-theta lens which focuses them into the growth plane (e.g., the focal plane).

The growth chamber preferably includes one or more translation stage for producing a relative change between the substrate (and any skeleton formed thereon) and the focal plane of the laser (as set by the imaging optics). The translation stage can translate the substrate, the imaging module, the diffractive element (particularly for rotations), the laser, and/or other suitable component of the deposition system. As a first example, a translation stage can enable movement of the substrate along an axis parallel to the light propagation direction for the laser. As a second example, a translation stage can enable translation of the substrate in a first axis orthogonal to the light propagation direction of the laser and in a second axis parallel to the light propagation direction of the laser. As a third example, a translation stage can enable translation of the substrate in a first axis and a second axis orthogonal to the light propagation direction of the laser and in a third axis parallel to the light propagation direction of the laser. As a fourth example, a translation stage can enable translation of the substrate in a first axis orthogonal to the light propagation direction of the laser. As a fifth example, a translation stage can enable translation of the substrate in a first axis and a second axis orthogonal to the light propagation direction of the laser. As a sixth example, a translation stage can enable translation of the substrate in a first axis parallel to the light propagation direction of the laser and a second translation stage can enable rotation of a light modulator (e.g., DOE, SLM, etc.). However, other suitable translation stages and/or motors can be used.

The growth chamber is preferably coupled to a computing system which can function to determine a light pattern to grow the target skeleton (e.g., a phase, amplitude, polarization, diffraction, etc. pattern of the SLM that will result in the light pattern when the light passes through the SLM and the imaging optics). The computing system can additionally or alternatively determine corrections or refinements to the light pattern (e.g., to correct for aberrations such as defocus, spherical aberration, coma, astigmatism, field curvature, image distortion, chromatic aberrations, etc. resulting from optical elements such as the imaging system, the SLM, etc.; to correct for deviations between the expected skeleton structure and actual skeleton structure during growth such as detected using computer vision, sensor measurements, depth sensors, etc.; etc.). However, the computing system can otherwise function. The computing system can include one or more: CPUs, GPUs, custom FPGA/ASICS, microprocessors, servers, cloud computing, and/or any other suitable components. The computing system can be local (e.g., to the growth chamber), remote (e.g., cloud computing server, from the growth chamber, etc.), distributed (e.g., between a local and remote computing system), or otherwise arranged relative to any other system. In some variations, the computing system can be GPU accelerated to facilitate rapid solutions for the target hot spots and/or how to generate them.

5. Method

As shown for example in FIG. 3, a variant of a method for forming a skeleton can include generating the optical hot spots S200, and growing material at the optical hot spots to form the skeleton S300. The method can optionally include providing instructions for spatial locations of optical hot spots S100, subtractively machining the skeleton S400, infilling the skeleton S500, and/or other suitable steps.

The method can be performed in real or near-real time (e.g., beam patterns can be determined during deposition of material to form the skeleton) and/or with delayed timing (e.g., different beam patterns can be predetermined before the beam patterns are needed for the optical output). The method is typically performed iteratively (e.g., for adjacent unit cells, for each layer or slice of a skeleton, etc.). For instance, the method can be performed at or near a repetition rate (e.g., frame rate, refresh rate, etc.) of an SLM (e.g., 20 fps, 30 fps, 45 fps, 60 fps, 100 fps, 110 fps, 120 fps, 180 fps, 240 fps, etc. for a liquid crystal device where each frame is typically, but not necessarily, associated with a different slice of the skeleton). However, the method could be performed with other suitable timing.

Providing instructions for spatial locations of hot spots S100 functions to determine (e.g., generate, receive, calculate, estimate, etc.) a plurality of hot spots to form a skeleton (e.g., a skeleton as described above). The spatial locations preferably refer to slices of the target skeleton where successive slices are used to build the full skeleton. The slices are preferably 2D (e.g., correspond to a two-dimensional plane of the skeleton) with a threshold thickness (e.g., such as a thickness comparable to about a Rayleigh range of light used to generate hot spots, comparable to a heating element size used to generate the hot spots, etc.). The 2D slice can be flat, curved (e.g., with a curvature substantially matching a curvature in light matching, conjugate to, etc. an imaging optic), oscillating, and/or have other suitable characteristics. However, the slices can additionally or alternatively have any suitable dimensionality. S100 is particularly useful in variants where the deposition chamber uses an SLM (or other light manipulator like AOM, MEMS, etc.) to determine focal spot locations for each slice of the skeleton (e.g., in variants of the method where the skeleton is generated by changing the hot spot locations).

Generating the laser spots S200 functions to form local laser spots that can be used to produce hot spots (e.g., regions of elevated temperature on the substrate or existing skeleton thus far) where precursor material can deposit to form the skeleton material with a target geometry. The laser spots are preferably generated by converting the optical light from a single beam into a plurality of beams, each beam with a target power and/or direction. However, a plurality of separate lasers can be aligned to generate the laser spots and/or the laser spots can otherwise be formed. As a first example, a laser can be diffracted through a diffractive optical element to produce a plurality of laser spots with given angular separation (that can be converted to a given separation distance at a focal plane from the imaging optics). As a second example, the beam can be split using the SLM with a target pattern (e.g., the instructions generated in S100), where a different pattern can be used for each slice of the skeleton. However, the hot spots could otherwise be generated.

In some variations generating the laser spots can include tuning the optical intensity. The optical intensity can be tuned globally (e.g., affecting the optical module as a whole) and/or locally (e.g., affecting a specific hot spot). Examples of global tuning parameters include: total power provided to or from the laser and/or lasing medium, using attenuators (e.g., polarizer pairs, polarizer waveplate combinations, neutral density filters, etc.), optical scattering and/or diffusing films, and/or other suitable global shifts. Examples of local tuning parameters include: total power of the laser provided to a given hot spot (e.g., controlled based on the SLM, amount of light diffracted or diverted to a given spot, etc.), inclusion of local attenuators (e.g., an attenuator that only blocks optical radiation in a particular direction), by diverting light to an optical blocker (e.g., using the SLM), and/or other suitable local tuning parameters.

For each slice of the skeleton, S200 preferably generates instructions for where hot spots should occur to produce a given slice of the skeleton. The instructions can be generated algorithmically (e.g., according to a set of equations or relationships), using artificial intelligence (e.g., trained using training data generated from a plurality of training skeletons and the set of hot spots used to generate each of the plurality of training skeletons), and/or in any manner. As a specific example, the instructions can be generated by using the Gerchberg Saxton algorithm (e.g., an iterative phase retrieval algorithm). In variations of this specific example, the algorithm can be sped up by using a preceding slices solution as an initial starting point. In some variations (in combination or isolation from the other variations described), the algorithm can be modified to accommodate sensor readings and/or data derived therefrom (e.g., a difference between an expected skeleton and an observed skeleton configuration) to update a slice (e.g., to bring the skeleton into closer conformity with the expected or target skeleton or layer thereof).

The instructions can be generated based on (e.g., inputs to the computing system used to determine the instructions can include): the target skeleton, sensor measurements (e.g., at approximately a current snapshot in time), a difference between a skeleton slice and a target skeleton slice (e.g., determined based on sensor measurements), deposition chamber layout (e.g., inlet or outlet locations, number of optical modules, number of SLMs, types of SLMs, laser parameters, imaging optics parameters, etc.), deposition chamber operating parameters (e.g., growth chamber temperature, pressure, flow rate, precursor material(s), flow direction(s), etc.), substrate parameters (e.g., material, flatness, thermal conductivity, absorptivity, etc.), and/or other suitable information. As a simplified illustrative example, a layer of the skeleton that included four pillars would result in the generation of instructions for the formation of four hot spots coincident with the spatial separation of those four pillars.

As an illustrative example, the instructions can include (for laser assisted deposition): laser intensity as a function of spatial position, total laser intensity, precursor flow rate, pixel by pixel parameters for a liquid crystal to diffract the laser into the spatial positions (e.g., with the target intensity), and/or other suitable information.

Growing material S300 functions to form the skeleton. S300 can include focusing the laser spots (e.g., using an imaging module) on a substrate and/or underlying skeleton resulting in locally heating the substrate and/or underlying skeleton (e.g., using the laser spots from S200 where hot spots of the substrate are substantially identical to the locations of the laser spots on the substrate), providing skeleton precursor material into a growth chamber where the precursor material can preferably deposit at the hot spots to form the skeleton material, and translating the substrate relative to a focal plane of the laser spots to facilitate growth of the skeleton (where the skeleton is typically initially grown on a substrate followed by growth occurring on the already deposited skeleton material, i.e., lattice growth upon lattice growth). S300 is preferably performed contemporaneously or simultaneously with S200. However, S300 can be performed with any suitable delay relative to S200.

The hot spots preferably achieve a local temperature at least about 500° C. (e.g., 600° C., 750° C., 1000° C., 2000° C., 2500° C., 3000° C., 3500° C., 5000° C., etc.) hotter than other locations on the substrate and/or underlying skeleton (e.g., achieve a temperature such that the precursor can stick or react at the hot spot and not substantially anywhere else). Additionally or alternatively, the hot spot temperature can refer to an approximate actual local temperature of a given hotspot. The substrate preferably does not melt due to the hot spot. Similarly, the hot spot is preferably sufficiently high in temperature to facilitate deposition of the precursor material (e.g., decomposition of the precursor and deposition of atoms thereof with target arrangement). However, the hot spot can achieve any suitable temperature.

Translating the substrate relative to a focal plane of the laser spots S380 functions to add material to the skeleton members where they are heated by laser-induced hot spots by manipulating the laser foci in 3D space to build trussed 3D skeletons (e.g., of essentially arbitrary shapes). For example, the substrate can be translated along an axis parallel to the optical propagation axis to facilitate 3D growth of the skeleton (e.g., perpendicular to a broad face of the substrate such as to form pillars, cones, pyramids, polyhedrons, etc. extruded from a broad face or surface of the substrate). In a second example, the substrate can be translated along an axis that is perpendicular to the optical propagation axis (e.g., to tile the substrate with skeletons, where separate tiles can be joined together and/or remain as separate free-standing skeletons; to forming joining regions connecting two or more neighboring skeleton members with a gap between them; etc.). In some variations of the second example, the skeleton can be split into separate layers (e.g., corresponding to different heights above the substrate). In these variations, the skeleton is preferably tiled prior to forming higher layers (e.g., to reduce a chance or amount of shadowing resulting from neighboring skeleton regions of differing heights). However, the tiling can be performed after growing a first tile to a target height and then growing a subsequent tile. In a third example, the substrate can be translated at an oblique angle (e.g., an angle between 0° and 90° not inclusive of the endpoints) relative to the optical propagation direction (e.g., resulting in growth of skeleton material at an oblique angle to the broad face of the substrate). However, instead of a translation of the substrate, similar effects could be achieved in any other manner (e.g., with variable imaging system such as reconfiguring a focal length of the imaging system potentially coupled with changes to the SLM, DOE, galvanometer, actuator, etc.). Additionally or alternatively, in some variants the substrate (and/or optical elements) can be rotated (intermittently and/or continuously) to produce curved and/or helical structures in the skeleton.

In some variants, S300 can include tiling the skeleton. The skeleton is preferably tiled by repeating the growth processes (e.g., all of the steps used to grow a first skeleton region are repeated on a new portion of the substrate).

In some variants, S300 can grow each unit cell or accessible hot spot region to a maximum or target height before proceeding to a different (e.g., neighboring region on the substrate). In other variants, different spatial regions can be grown simultaneously (e.g., by using a plurality of optical modules or lasers each coupled to an SLM, DOE, AOM, etc. by splitting the output from a single optical module or SLM into different locations, etc. such as tiled laser heads, tiled SLMs, using an actuator or beam steering optics to split and reposition laser spots or grow material at many simultaneous spatial regions, etc.). In another variant, a first region can only be grown to a threshold height (less than the total or target height) before subsequent regions are grown (eventually returning to complete the growth to the target height), which can be beneficial for avoiding shadowing (e.g., obstruction of) of the light (or other heat generator) caused by existing skeleton material in the middle of growth.

Figure 8B:
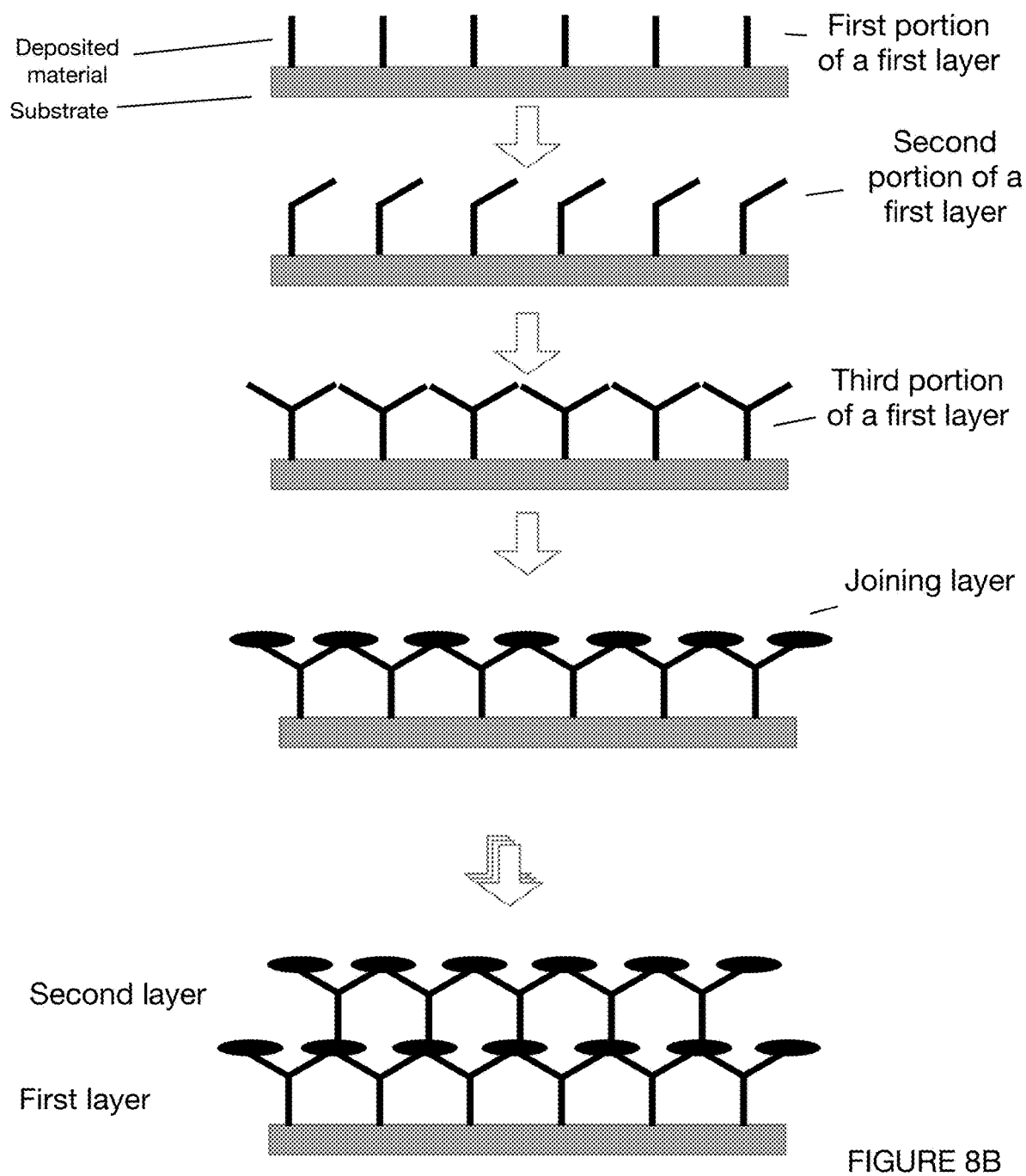
Figure 8C:
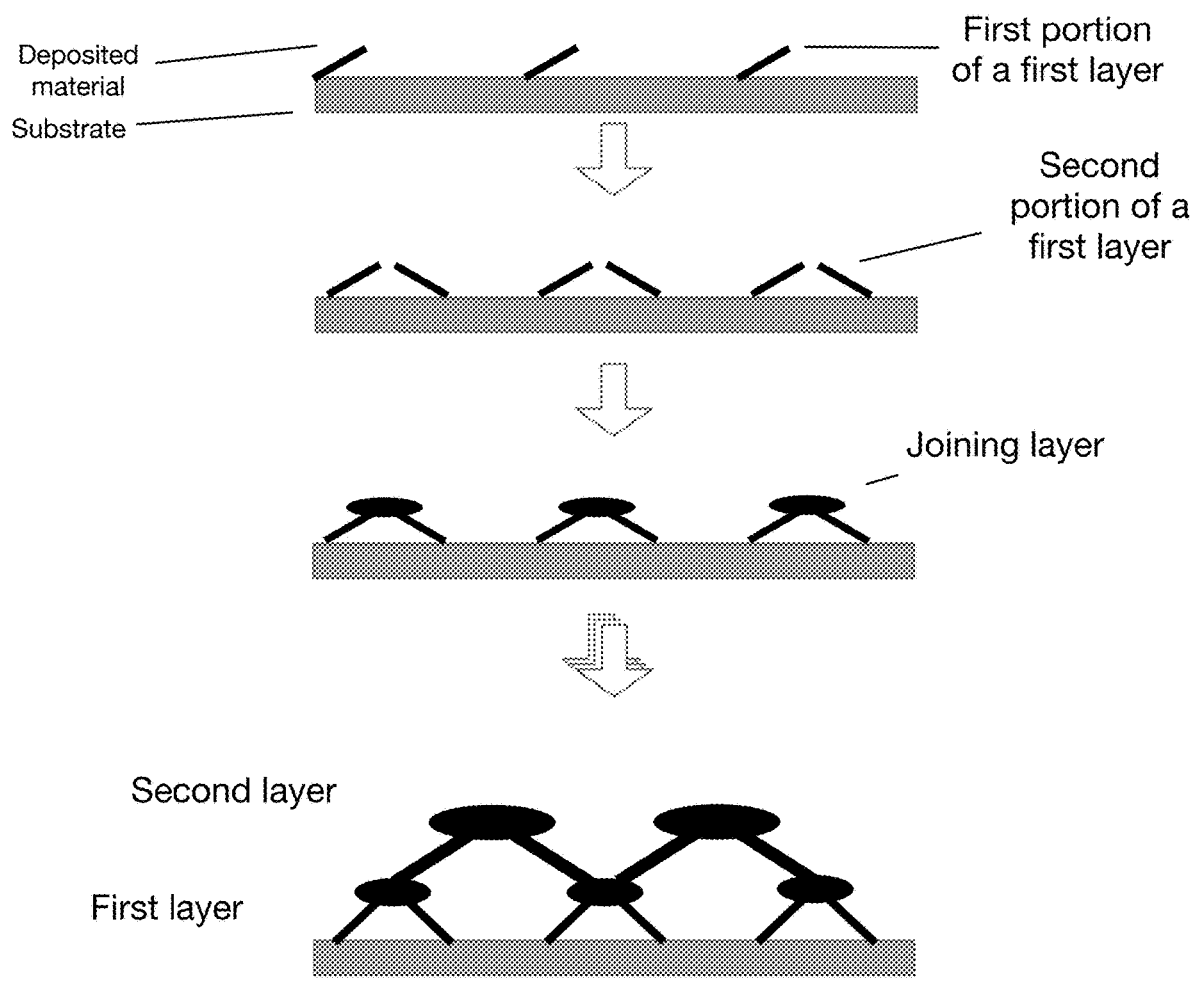

In some variants of S300 (as shown for example in FIG. 8A, FIG. 8B, FIG. 8C, or FIG. 12), a layer of a skeleton can be grown in a plurality of distinct portions. For instance, portions of the skeleton with a common orientation relative to the substrate broad face can be grown first, followed by growth of a second portion with a different orientation relative to the substrate can be grown. As a specific example, a layer of a skeleton can include first portions that are substantially perpendicular to (e.g., accounting for translational jitter or other minor variations from perfectly orthogonal) a broad face of the substrate (e.g., formed by keeping the laser spots at fixed locations in the focal plane and translating the substrate parallel to the optical propagation axis) and second portions that are at an oblique angle relative to the substrate (e.g., formed by keeping the laser spots at fixed locations in the focal plane and translating the substrate at an oblique angle to the optical propagation axis). In this example, the second portions are generally close to, but do not touch, second portions of other skeleton members (e.g., resulting in a gap between the second portions that can be between about 10 μm and 500 μm). These gaps can then be closed by a joining layer (e.g., formed by keeping the laser spots at fixed locations in the focal plane and translating the substrate substantially perpendicular to the optical propagation axis). In this example, subsequent skeleton layers can be grown on top of the joining layer, where the subsequent layers can be parallel to the lower layers, perpendicular to the lower layers, and/or can have other suitable relative orientation between layers. As a second specific example, a skeleton layer can be formed by growing a first set of separate members by growing a first portion of the first set of separate members (e.g., by depositing precursor material on the substrate while translating the substrate relative to the focal plane) followed by growing a second portion of the first set of separate members on the first portion (e.g., by depositing precursor material on the first portion while translating the substrate relative to the focal plane, where the angle between the translation axis and optical propagation axis for the first portion and the second portion are different) followed by growing a second set of separate members by growing a first portion of the second set of members (e.g., by depositing precursor material on the substrate while translating the substrate relative to the focal plane) and a second portion of the second set of members on the first portion of the second set of members (e.g., by depositing precursor material on the substrate while translating the substrate relative to the focal plane, where the angle between the translation axis and optical propagation axis for the first portion and the second portion are different, where the angle for the first set and the second set are preferably substantially the same) and finally joining the second portion of the first set of members to the second portion of the second set of members (e.g., by depositing precursor material on the substrate while translating the substrate relative to the focal plane over the gap between the first and second set of members). In some variations (e.g., when the members form an oblique angle to the substrate such as shown in FIG. 8C), the first and second set of members can each include a single portion. However, individual members can include any suitable number of portions (as shown for example in FIG. 8B). In other variations (as shown for instance in FIG. 10), the distinct portions can be formed by changing an incident angle of the laser (e.g., using beam steering, SLM, etc.) relative to the focal plane of the laser. In yet other variations, many simultaneous spatial regions can be grown simultaneously.

Optionally subtractively machining the skeleton S400 functions to change a geometry of a bounding volume (e.g., a closed volume surface that fully surrounds the skeleton). Typically, the machined skeleton will have a resulting bounding volume substantially identical to that of a target object (i.e., be a near-net shape). S400 can be advantageous as the porous skeleton structure can be easier to machine compared to a densified object (particularly, but not exclusively, true for refractory materials). Examples of subtractive manufacturing processes that can be performed to achieve a near-net object include (but are not limited to): turning, drilling, boring, milling, reaming, cutting, contouring, facing, slicing, laser cutting (optionally using the same laser as used for deposition processes), and/or other processes to modify a geometry of the skeleton.

Optionally, infiltrating the skeleton S500 which can function to fill in a void space of the skeleton (e.g., with deposited material, matrix material, infill, etc.) to grow a substantially solid object (e.g., by filling void space in the skeleton, by direct growth on the skeleton, etc.). The deposited material(s) can be added to the skeleton using chemical vapor deposition, physical vapor deposition, moulding, machining, automated fiber placement, filament winding, lanxide processing, tufting, z-pinning, casting, centrifugal casting, braiding, continuous casting, filament winding, press moulding, transfer moulding, pultrusion moulding, slip forming, vacuum infusion, wet lay-up, compression moulding, electroplating, electroless plating, and/or using other suitable methods and/or processes. The deposited material can partially or fully fill the void spaces in the skeleton. For instance, the void volume (after S500 or a plurality of iterations thereof) of the infilled skeleton can be between about 0% (i.e., fully densified) and about 70%. The skeleton can be infilled with any suitable material (e.g., any suitable skeleton material that may or may not be the same as the specific material of the skeleton itself in any given variant).

Optionally, processing the filled skeleton (e.g., grown object) S600 which can function to finish the filled skeleton. For example, S600 can function to increase a density of the resulting material (e.g., by closing or removing void space or pores resulting from the deposited materials growth process such as by pressing, sintering, annealing, etc.), form the fabricated material into a net-shape, improve a surface finish of fabricated material (e.g., form planar broad faces of the surface of the fabricated material, polishing the fabricated material, etc.), convert a composite fabricated material into a compound or alloy, removing a substrate and/or skeleton from a material (e.g., via cutting, etching, etc.), and/or can otherwise function.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, and/or FPGA/ASIC. However, the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the preceding system and/or method can be used with, in addition to, in lieu of, or otherwise integrated with all or a portion of the systems and/or methods disclosed in the applications mentioned above, each of which are incorporated in their entirety by this reference.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

As a person skilled in the art will recognize from the previous detailed description and from the figures and claims, modifications and changes can be made to the preferred embodiments of the invention without departing from the scope of this invention defined in the following claims.

6. Specific Examples

A numbered list of specific examples of the technology described herein are provided below. A person of skill in the art will recognize that the scope of the technology is not limited to and/or by these specific examples.

1. A refractory material foam comprising: a plurality of substantially identical unit cells, wherein each unit cell of the plurality of identical unit cells comprises: a first set of linear members aligned along a first axis, wherein the first axis is perpendicular to a plane defined by a broad face of a substrate; a second set of linear members aligned along a second axis, wherein the second axis forms an oblique angle to the first axis; and a plurality of fusion points that join a first unit cell of the plurality of identical unit cells to a second unit cell of the plurality of identical unit cells, wherein the first unit cell and the second unit cell are adjacent to one another, wherein a first linear member of the second set of linear members and a second linear member of the second set of linear members are joined together by a fusion point of the plurality of fusion points; wherein a density of the refractory material foam is at most 5% of a density of fully densified refractory material.

2. The refractory material foam of Specific Example 1, wherein a linear member of the first set of linear members comprises a diameter in a cross-section perpendicular to the first axis of between 3 μm and 200 μm (e.g., 10-20 μm).

3. The refractory material foam of any of Specific Examples 1-2, wherein a linear member of the first set of linear members comprises a height parallel to the axis of between 0.1 mm and 5 mm.

4. The refractory material foam of any of Specific Examples 1-3, wherein a fusion point of the plurality of fusion points, wherein a characteristic size of the fusion point is larger than a characteristic size of a linear member of the first set of linear members or the second set of linear members.

5. The refractory material foam of Specific Example 4, wherein a unit cell of the plurality of identical unit cells is on a fusion point of the plurality of fusion points.

6. The refractory material foam of any of Specific Examples 4-5, wherein the fusion point of the plurality of fusion points is an ellipsoidal conglomeration (agglomeration, bead, etc.) of the refractory material.

7. The refractory material foam of any of Specific Examples 1-6, wherein the refractory material is composed essentially of pyrolyzed carbon.

8. The refractory material foam of any of Specific Examples 1-7, wherein at least one of a height, width, or length of the refractory material foam is greater than 5 cm.

9. The refractory material foam of any of Specific Examples 1-8, wherein an arithmetic roughness average of linear members of the first set of linear members and the second set of linear members is less than about 10 μm.

10. A composite material comprising: the refractory material foam of any of Specific Examples 1-9; and a filler material that substantially fully fills pores of the refractory material foam.

11. An ordered lattice composed of a refractory material, comprising a plurality of unit cells wherein each unit cell comprises a unit cell lattice arranged in a G7 lattice, a diamond lattice, a body centered cubic with Z strut lattice, or a face centered cubic with Z strut lattice; wherein each structural member of the unit celllattice comprises a diameter of between 3 μm and 200 μm, wherein the plurality of unit cells are fused together, and wherein a porosity of the ordered lattice is at least 95%.

12. The ordered lattice of refractory material of Specific Example 11, wherein adjacent unit cells of the unit cell latices are fused together at fusion points using additional refractory material, wherein the fusion points have with a characteristic size greater than the diameter of a structural member of the unit cell lattice.

13. The ordered lattice of refractory material of Specific Example 12, wherein additional unit cells of the plurality of unit cell lattices are arranged on top of the fusion points.

14. The ordered lattice of refractory material of any of Specific Examples 11-13, wherein the refractory material consists essentially of pyrolyzed carbon.

15. The ordered lattice of refractory material of any of Specific Examples 11-14, wherein at least one of a height, width, or length of the ordered lattice of refractory material is greater than 5 cm.

16. The ordered lattice of refractory material of any of Specific Examples 11-15, wherein a height of a unit cell lattice is between 0.1 mm and 5 mm.

17. The ordered lattice of refractory material of any of Specific Examples 11-16, wherein a surface of each structural member of the unit cell lattice is smooth.

18. The ordered lattice of refractory material of Specific Example 17, wherein an arithmetic roughness average of each structural member of the unit cell lattice is less than about 10 μm.

19. A composite material comprising: the ordered lattice of refractory material of any of Specific Examples 11-18; and a filler material that substantially fully fills the pores of the ordered lattice of refractory material.

20. The composite material of any of Specific Examples 10 or 19, wherein the filler material is selected from the group consisting of: diamond, silicon carbide, refractory metals, transition metal carbides, or combinations thereof.

21. A method comprising: generating, from a single laser beam, a plurality of individual laser beams using a light modulator; focusing the plurality of individual laser beams onto a focal plane initially substantially coincident with a broad face of a substrate to produce a plurality of individual focused laser spots, wherein a focal spot size of each individual focused laser spot at the focal plane is between 1 µm and 100 µm; introducing a (gaseous) deposition precursor into a deposition chamber, wherein the substrate is arranged within the deposition chamber, wherein laser light enters the deposition chamber through an optical window, wherein material derived from the gaseous deposition precursor deposits within a locally heated region proximal the plurality of individual focused laser spots to form deposited material (e.g., on the substrate, on previously deposited material); and relatively moving the substrate and the individual focused laser spots; wherein the deposited material forms an interconnected foam.

22. The method of Specific Example 21, further comprising changing a relative intensity of each individual laser spot of the individual laser spots.

23. The method of any of Specific Examples 21-22, further comprising depositing an infill material within voids of the interconnected foam to form a densified object, wherein a density of the densified object is at least 80% of a density of the infill material.

24. The method of any of Specific Examples 21-23, wherein the interconnected foam is a freestanding foam with at least one of a length, width, or height that is greater than 5 cm.

25. The method of any of Specific Examples 21-24, wherein surfaces of the interconnected foam comprise an arithmetic roughness average less than about 10 µm.

26. A method comprising, within a deposition chamber: flowing a deposition precursor into the deposition chamber; focusing a plurality of individual laser spots on a focal plane initially substantially coincident with a broad face of a substrate; wherein within the individual laser spots a temperature of the substrate is greater than 300° C. (e.g. 500° C., 750° C., 1000° C., 1500° C., 2000° C., 2500° C., 3000° C., etc.); depositing the material derived from the deposition precursor substantially only within a locally heated region (e.g., on a substrate, on previously deposited material) within the individual laser spots to form deposited material; and moving the substrate relative to the individual laser spots; wherein the deposited material forms an interconnected.

27. The method of Specific Example 26, wherein a (nearest-neighbor) separation between the individual laser spots of the plurality of laser spots is substantially constant.

28. The method of Specific Example 27, wherein the plurality of laser spots are generated from a single laser beam passed through a diffractive optical element and focused onto the focal plane using an f-theta lens.

29. The method of Specific Example 28, wherein the f-theta lens is a telecentric lens.

30. The method of any of Specific Examples 26-29, wherein the plurality of individual laser spots comprises between 20 and 1000 laser spots, wherein an average power of each individual laser spot is between 1 mW and 10 W.

31. The method of any of Specific Examples 26-30, wherein the deposition precursor is selected from the group consisting of: methane, ethane, ethene, ethyne, propane, propene, propyne, butane, butene, butyne, benzene, naphthalene, toluene, or combinations thereof.

32. The method of Specific Example 31, wherein the material derived from the deposition precursor consists of non-graphitizing carbon.

33. The method of any of Specific Examples 26-32, wherein the plurality of individual laser spots have a wavelength between 0.2 and 1.7 µm; wherein a characteristic size, in a plane perpendicular to a light propagation axis of the plurality of individual laser spots, of members forming the interconnected foam is between 3 µm and 200 µm.

34. The method of any of Specific Examples 26-33, wherein moving the substrate relative to the individual laser spots comprises: translating the substrate in a first direction parallel to an optical axis of a focusing optic (e.g., the f-theta lens); translating the substrate in a second direction at a first oblique angle to the optical axis of the focusing optic.

35. The method of Specific Example 34, wherein moving the substrate relative to the individual laser spots further comprises: while the plurality of individual laser spots are off, resetting the substrate to substantially coincident with the focal plane and displaced from an initial position of the substrate in the x-y plane perpendicular to the propagation direction; after the plurality of individual laser spots are on, translating the substrate in a third direction parallel to the optical axis of the focusing optic; translating the substrate in a fourth direction at a second oblique angle to the optical axis of the focusing optic, wherein the second oblique angle is mirrored relative to the first oblique angle.

36. The method of Specific Example 35, wherein moving the substrate relative to the individual laser spots further comprises translating the substrate in a fifth direction substantially perpendicular to the optical axis of the focusing optic.

37. The method of Specific Example 36, further comprising repeating translating the substrate to build a second layer of deposited material on the layer of deposited material formed by translating the substrate.

38. The method of any of Specific Examples 26-37, wherein surfaces of the interconnected foam are smooth.

39. The method of any of Specific Examples 26-38, further comprising subtractively machining the interconnected foam to create a near net-shape object from the material.

40. The method of Specific Example 39, wherein a fraction of a volume of a unit cell of the interconnected foam occupied by the deposited material is between 0.000001% and 10%.

41. A refractory material foam comprising a plurality of struts made from a refractory material, wherein each strut of the plurality of struts is fused to one or more other struts of the plurality of struts using the refractory material at a fusion point, wherein each strut of the plurality of struts is arranged in a determined spatial location.

42. The refractory material foam of Specific Example 41, wherein a cross-section of each strut of the plurality of struts normal to a surface of the strut is circular or elliptical.

43. The refractory material foam of Specific Example 42, wherein the cross-section of each strut of the plurality of struts is substantially constant along a length of the respective strut.

44. The refractory material foam of any of Specific Examples 42-43, wherein a diameter of the cross-section is between 3 µm and 200 µm.

55. The refractory material foam of any of Specific Examples 41-44, wherein a distance between a first fusion point and a second fusion point of each strut of the plurality of struts is between 0.1 mm and 10 mm.

46. The refractory material foam of any of Specific Examples 41-45, wherein the fusion point of the plurality of fusion points is an ellipsoidal conglomeration of the refractory material.

47. The refractory material foam of any of Specific Examples 41-46, wherein the refractory material is composed essentially of pyrolyzed carbon.

48. The refractory material foam of any of Specific Examples 41-47, wherein at least one of a height, width, or length of the refractory material foam is greater than 5 cm.

49. The refractory material foam of any of Specific Examples 41-48, wherein an arithmetic roughness average of each strut of the plurality of struts is less than about 10 µm.

50. The refractory material foam of any of Specific Examples 41-49, further comprising an inhomogeneous distribution of pores with an increasing average pore size along a spatial direction.

51. A composite material comprising: the refractory material foam of any of Specific Examples 41-50; and a filler material that fills pores of the refractory material foam.

52. An ordered lattice composed of a refractory material, comprising a plurality of unit cells wherein each unit cell comprises two struts that trace different paths within the respective unit cell, wherein the two struts are fused together at least once within the respective unit cell, and wherein the plurality of unit cells are fused together.

53. The ordered lattice of refractory material of Specific Example 52, wherein each unit cell of the plurality of unit cells is identical.

54. The ordered lattice of refractory material of any of Specific Examples 52-53, wherein the plurality of unit cells change in at least one dimension within the ordered lattice to produce anisotropic pores of within the ordered lattice.

55. The ordered lattice of refractory material of any of Specific Examples 52-54, wherein a cross-section orthogonal to a surface of the two struts is circular or elliptical.

56. The ordered lattice of refractory material of Specific Example 55, wherein the cross-section of the two struts is substantially constant along a length of the two struts.

57. The ordered lattice of refractory material of Specific Examples 52-56, wherein a surface of the two struts is smooth.

58. The ordered lattice of refractory material of Specific Examples 52-57, wherein the two struts form part of a G7 lattice, a diamond lattice, a body centered cubic with Z strut lattice, or a face centered cubic with Z strut lattice.

59. The ordered lattice of refractory material of Specific Examples 52-58, wherein the refractory material consists essentially of pyrolyzed carbon.

60. The ordered lattice of refractory material of Specific Examples 52-59, wherein a fraction of a volume of the unit cell occupied by the refractory material is between 0.000001% and 10%.

61. The method of any of Specific Examples 21-25, wherein the light modulator comprises a diffractive optical element.

62. The method of any of Specific Examples 21-25 or 61, further comprising changing a position of at least one laser spot of the plurality of individual focused laser spots within the focal plane using a motorized beam steering apparatus.

63. The method of Specific Example 62, wherein the motorized beam steering apparatus is a galvanometer or motorized mirror, wherein the plurality of individual laser spots form a global pattern of laser spots in the focal plane defined by a diffractive optical element, wherein the global pattern of laser spots is translated in the focal plane using the galvanometer or motorized mirror.

64. The method of any of Specific Examples 26-40, further comprising infilling the interconnected foam with a second deposited material.

65. A method for forming the foam or ordered lattice of any of Specific Examples 1-20 or 41-60.

66. An ordered sponge (e.g., ceramic sponge, ceramic foam, refractory sponge, refractory foam, skeleton, cermet sponge, cermet foam, trussed network, space frame, etc.) formed using the method of any of Specific Examples 21-40 or 61-64.

We claim:

1. A method of forming an interconnected foam comprising:
    generating a plurality of individual laser beams using a light modulator;
    focusing the plurality of individual laser beams onto a focal plane initially substantially coincident with a broad face of a substrate to produce a plurality of individual focused laser spots, wherein a focal spot size of each individual focused laser spot at the focal plane is between 1 um and 100 um;
    introducing a gaseous deposition precursor into a deposition chamber, wherein the substrate is arranged within the deposition chamber, wherein laser light enters the deposition chamber through an optical window, wherein material derived from the gaseous deposition precursor deposits within a locally heated region proximal the plurality of individual focused laser spots to form deposited material; and
    relatively moving the substrate and the individual focused laser spots;
    wherein the deposited material forms the interconnected foam.

2. The method of claim 1, further comprising changing a relative intensity of each individual laser spot of the individual laser spots.

3. The method of claim 1, wherein the interconnected foam is a freestanding foam with at least one of a length, width, or height that is greater than 5 cm.

4. The method of claim 1, wherein surfaces of the interconnected foam comprise an arithmetic roughness average less than about 10 µm.

5. The method of claim 1, wherein the light modulator comprises a diffractive optical element.

6. The method of claim 1, further comprising changing a position of at least one laser spot of the plurality of individual focused laser spots within the focal plane using a motorized beam steering apparatus.

7. The method of claim 6, wherein the motorized beam steering apparatus is a galvanometer or motorized mirror, wherein the plurality of individual laser spots form a global pattern of laser spots in the focal plane defined by a diffractive optical element, wherein the global pattern of laser spots is translated in the focal plane using the galvanometer or motorized mirror.

8. A method for forming an interconnected foam comprising, within a deposition chamber:
    flowing a gaseous deposition precursor into the deposition chamber;
    focusing a plurality of individual laser spots on a focal plane initially substantially coincident with a broad face of a substrate; wherein within the individual laser spots a temperature of the substrate is greater than 300° C.;
    depositing material derived from the gaseous deposition precursor substantially only within a locally heated region within the individual laser spots to form deposited material; and
    moving the substrate relative to the individual laser spots;
    wherein the deposited material forms the interconnected foam.

9. The method of claim 8, wherein a nearest-neighbor separation between the individual laser spots of the plurality of laser spots is substantially constant.

10. The method of claim 9, wherein the plurality of laser spots are generated from a single laser beam passed through a diffractive optical element and focused onto the focal plane using an f-theta lens.

11. The method of claim 8, wherein the plurality of individual laser spots comprise between 20 and 1000 laser spots, wherein an average power of each individual laser spot is between 1 mW and 10 W.

12. The method of claim 8, wherein the gaseous deposition precursor is selected from the group consisting of: methane, ethane, ethene, ethyne, propane, propene, propyne, butane, butene, butyne, benzene, naphthalene, toluene, or combinations thereof.

13. The method of claim 12, wherein the material derived from the deposition precursor consists of carbon.

14. The method of claim 8, wherein the plurality of individual laser spots have a wavelength between 0.2 and 1.7 μm; wherein a characteristic size, in a plane perpendicular to a light propagation axis of the plurality of individual laser spots, of members forming the interconnected foam is between 3 μm and 200 μm.

15. The method of claim 8, wherein moving the substrate relative to the individual laser spots comprises:

translating the substrate in a first direction parallel to an optical axis of a focusing optic;

translating the substrate in a second direction at a first oblique angle to the optical axis of the focusing optic.

16. The method of claim 15, further comprising repeating translating the substrate to build a second layer of deposited material on the layer of deposited material formed by translating the substrate.

17. The method of claim 8, wherein surfaces of the interconnected foam are smooth.

18. The method of claim 8, further comprising infilling the interconnected foam with a second deposited material.

19. The method of claim 8, further comprising subtractively machining the interconnected foam to create a near net-shape object from the material.

20. The method of claim 19, wherein a fraction of a volume of a unit cell of the interconnected foam occupied by the deposited material is between 0.000001% and 10%.

* * * * *